US011513932B2

(12) United States Patent
Xiao et al.

(10) Patent No.: US 11,513,932 B2
(45) Date of Patent: Nov. 29, 2022

(54) MEMORY ANOMALY DETECTION METHOD AND DEVICE

(71) Applicant: Huawei Technologies Co., Ltd., Shenzhen (CN)

(72) Inventors: Xin Xiao, Nanjing (CN); Kang Cheng, Nanjing (CN); Liang Zhang, Nanjing (CN); Jian Li, Shenzhen (CN); Jiyu Pan, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 215 days.

(21) Appl. No.: 16/749,711

(22) Filed: Jan. 22, 2020

(65) Prior Publication Data
US 2020/0159636 A1 May 21, 2020

Related U.S. Application Data

(63) Continuation of application No. PCT/CN2018/085006, filed on Apr. 28, 2018.

(30) Foreign Application Priority Data

Jul. 25, 2017 (CN) .......................... 201710614122.3

(51) Int. Cl.
*G06F 11/30* (2006.01)
*G06F 11/07* (2006.01)
(Continued)

(52) U.S. Cl.
CPC ...... *G06F 11/3037* (2013.01); *G06F 11/0757* (2013.01); *G06F 11/0772* (2013.01);
(Continued)

(58) Field of Classification Search
CPC ............. G06F 11/3037; G06F 11/0757; G06F 11/0772; G06F 11/3075; G06F 11/3476;
(Continued)

(56) References Cited

U.S. PATENT DOCUMENTS

2014/0372807 A1* 12/2014 Poola .................. G06F 11/3414
714/39
2016/0092325 A1 3/2016 Bar et al.
(Continued)

FOREIGN PATENT DOCUMENTS

CN 102591788 A 7/2012
CN 103106134 A 5/2013
(Continued)

OTHER PUBLICATIONS

Knewton, "Analyzing Java "Garbage First Garbage Collection" (G1GC) Logs," Oct. 12, 2016, Retrieved from the internet:https://medium.com/knerd/analyzing-java-garbage-first-garbage-collection-g1gc-logs-9d7d006596d0, 10 pages.
(Continued)

*Primary Examiner* — Masud K Khan
(74) *Attorney, Agent, or Firm* — Conley Rose, P.C.

(57) ABSTRACT

A method includes obtaining a first memory log, where the first memory log includes log information of a plurality of garbage collections, and log information of each garbage collection includes a garbage collection time, and includes at least one of a downtime, memory usage after garbage collection, and memory usage before garbage collection, obtaining, based on log information in a first detection time window, first statistical information corresponding to the first detection time window, and determining, based on the first statistical information corresponding to the first detection time window, an anomaly degree corresponding to the log information in the first detection time window.

24 Claims, 7 Drawing Sheets

(51) Int. Cl.
  *G06F 11/34* (2006.01)
  *G06F 12/02* (2006.01)
(52) U.S. Cl.
  CPC ...... *G06F 11/3075* (2013.01); *G06F 11/3476* (2013.01); *G06F 12/0246* (2013.01); *G06F 12/0253* (2013.01)
(58) Field of Classification Search
  CPC ............. G06F 12/0246; G06F 12/0253; G06F 11/073; G06F 11/0778; G06F 11/3452; G06F 11/34; G06F 11/0751
  See application file for complete search history.

(56) References Cited

U.S. PATENT DOCUMENTS

2016/0371181 A1  12/2016  Garvey et al.
2017/0269870 A1* 9/2017  So ........................... G06F 3/064
2017/0308449 A1* 10/2017 Mangione-Tran ...... G06F 12/00

FOREIGN PATENT DOCUMENTS

| CN | 104182320 A  | 12/2014 |
| CN | 106095689 A  | 11/2016 |
| CN | 106970862 A  | 7/2017  |
| KR | 20160122621 A | 10/2016 |

OTHER PUBLICATIONS

Sun, L., et al., "An Approach to Detection Memory Leak in JavaScript," Computerand Digital Engineering, vol. 43 No. 12, Dec. 2015. pp. 2229-2238. with English abstract.

Huajun, Q., "Research on Memory Leakage in Embedded Linux System", Tianjin University of Technology, Aug. 2006. With English abstract.

Pintard, Ludovic, "From safety analysis to experimental validation by fault injection—Case of automotive embedded systems," (Des analyses de securit a la validation experimentale par injection de fautes—Le cas des systemes embarques automobiles), XP055711353, 2015, 147 pages.

* cited by examiner

MEMORY ANOMALY DETECTION METHOD AND DEVICE

CROSS-REFERENCE TO RELATED APPLICATIONS

This application is a continuation application of International Patent Application No. PCT/CN2018/085006, filed on Apr. 28, 2018, which claims priority to Chinese Patent Application No. 201710614122.3, filed on Jul. 25, 2017. The disclosures of the aforementioned applications are hereby incorporated by reference in their entireties.

TECHNICAL FIELD

This application relates to the field of communications technologies, and in particular, to a memory anomaly detection method and device.

BACKGROUND

Generally, if a memory anomaly occurs in a network device, the network device is easily faulty, and further, a network is affected. For example, a memory leak is a type of memory anomaly. The memory leak means that heap memory in a program is not released or cannot be released because of a specific reason, and consequently, system memory is wasted, and further, a serious consequence such as a reduction in a program running speed or even a system crash is caused.

For example, a memory anomaly is particularly severe in a software defined networking (SDN) controller. The SDN controller is a "brain" of a network and is responsible for application of strategic control in an SDN network. Because the SDN controller stores all information about the SDN controller and almost the entire network, the anomaly such as the memory leak is enough to cause a crash of the SDN controller, and consequently, the network is disordered and breaks down.

Therefore, providing a method for detecting memory anomaly is currently an urgent problem to be solved. In an embodiment, to detect a memory anomaly of a network device, a threshold is usually set for memory usage after garbage collection. If the memory usage after garbage collection exceeds the threshold, it is determined that the memory anomaly occurs in a garbage collection time of the garbage collection. However, accuracy of determining, using the memory usage that is after garbage collection and that corresponds to one garbage collection, whether the memory anomaly occurs is not high.

SUMMARY

Embodiments of this application provide a memory anomaly detection method and device, to accurately detect a memory anomaly degree.

According to a first aspect, an embodiment of this application provides a memory anomaly detection method. The method includes obtaining a first memory log, where the first memory log includes log information of a plurality of garbage collections, and log information of each garbage collection includes a garbage collection time, and includes at least one of a downtime, memory usage after garbage collection, and memory usage before garbage collection, obtaining, based on log information in a first detection time window, first statistical information corresponding to the first detection time window, where the log information in the first detection time window is log information in which a garbage collection time belongs to the first detection time window, and the first statistical information includes at least one of an average downtime in the first detection time window, a change from memory usage before earliest garbage collection in the first detection time window to memory usage after latest garbage collection in the first detection time window, and the memory usage after the latest garbage collection in the first detection time window, and determining, based on the first statistical information corresponding to the first detection time window, an anomaly degree corresponding to the log information in the first detection time window. Optionally, the first detection time window may include log information of one garbage collection, or may include the log information of the plurality of garbage collections.

It can be learned that, by implementing the method described in the first aspect, a memory anomaly detection device does not determine the anomaly degree of the log information based on memory usage after one garbage collection, but determines the anomaly degree of the log information based on statistical information of the log information in a period of time, that is, determines, based on the first statistical information corresponding to the first detection time window, the anomaly degree corresponding to the log information in the first detection time window. The anomaly degree corresponding to the log information may be used to represent an anomaly degree of the garbage collection time that corresponds to the memory and that is in the log information. Therefore, accuracy of detecting memory anomaly is relatively high.

In addition, in other approaches, a memory anomaly degree is determined based on only memory usage after garbage collection of one garbage collection, and in this case, the accuracy of detecting the memory anomaly is relatively low. However, in this application, the log information includes the memory usage after garbage collection, and may further include the downtime and the memory usage before garbage collection. Therefore, a memory anomaly detection device may determine, based on log information that includes a plurality of pieces of dimension information in a period of time, the anomaly degree corresponding to memory. In this way, the anomaly degree corresponding to the memory may be more accurately determined.

Optionally, a specific implementation of determining, based on the first statistical information corresponding to the first detection time window, an anomaly degree corresponding to the log information in the first detection time window may be determining, based on the first statistical information corresponding to the first detection time window, an anomaly degree corresponding to the first detection time window, and determining the anomaly degree corresponding to the first detection time window as an anomaly degree corresponding to first log information in the first detection time window. By implementing this implementation, the anomaly degree corresponding to the log information in the first detection time window may be accurately determined.

Optionally, the first log information is log information that belongs to the first detection time window and does not belong to a detection time window before the first detection time window. In other words, an anomaly degree corresponding to log information jointly owned by a plurality of detection time windows is an anomaly degree of an earliest detection time window in the plurality of detection time windows. By implementing this implementation, the anomaly degree corresponding to the log information in the first detection time window may be accurately determined.

Optionally, the first log information is any log information in the first detection time window. In other words, the anomaly degree corresponding to log information jointly owned by the plurality of detection time windows is an anomaly degree of a latest detection time window in the plurality of detection time windows. By implementing this implementation, the anomaly degree corresponding to the log information in the first detection time window may be accurately determined.

Optionally, after the anomaly degree corresponding to the log information in the first detection time window is determined, if there is log information with a high anomaly degree, memory usage after garbage collection in the log information with the high anomaly degree is less than preset usage, and a downtime in the log information with the high anomaly degree is less than a preset downtime, an anomaly degree corresponding to the log information with the high anomaly degree is adjusted to a non-high anomaly degree. Otherwise, the anomaly degree corresponding to the log information with the high anomaly degree is maintained as the high anomaly degree.

Higher memory usage and a longer downtime indicate a higher probability of memory anomaly. Therefore, adjusting, using the memory usage after garbage collection in the log information and the downtime in the log information, the anomaly degree of the log information helps improve accuracy of the anomaly degree of the log information.

Optionally, the first statistical information further includes a quantity of garbage collections in the first detection time window. The memory anomaly degree is detected using more parameters, and this helps improve accuracy of a detection result.

Optionally, if the log information with the high anomaly degree continually occurs for a preset quantity of times in a preset time period, an alarm is raised for the memory anomaly. By implementing this implementation, the alarm can be raised for the memory anomaly in a timely manner such that a measure can be taken to resolve the memory anomaly in the timely manner.

Optionally, a specific implementation of determining, based on the first statistical information corresponding to the first detection time window, an anomaly degree of the log information in the first detection time window may be determining, according to an anomaly degree determining rule and based on the first statistical information corresponding to the first detection time window, the anomaly degree of the log information in the first detection time window. The anomaly degree determining rule is obtained in advance based on a garbage collection time, and at least one of a downtime, memory usage after garbage collection, and memory usage before garbage collection that are included in a second memory log.

The anomaly degree determining rule is obtained through analyzing and calculation based on the garbage collection time, the downtime, and the memory usage after garbage collection that are included in the second memory log. The anomaly degree determining rule is not a rule set by a person. Therefore, by implementing this implementation, the accuracy of the detection result of the memory anomaly degree is improved.

Optionally, the anomaly degree determining rule includes conditions that correspond to different anomaly degrees respectively. A specific implementation of determining, according to the anomaly degree determining rule and based on the first statistical information corresponding to the first detection time window, the anomaly degree of the log information in the first detection time window may be determining an anomaly degree corresponding to a condition met by the first statistical information of the first detection time window as an anomaly degree of the first detection time window, and determining, based on the anomaly degree corresponding to the first detection time window, the anomaly degree corresponding to the log information in the first detection time window. For example, the anomaly degree corresponding to the first detection time window is determined as the anomaly degree corresponding to the first log information in the first detection time window. The first log information is any log information in the first detection time window. Alternatively, the first log information is the log information that belongs to the first detection time window and does not belong to the detection time window before the first detection time window.

Optionally, before the obtaining a first memory log, the method further includes obtaining the second memory log, where the second memory log includes log information of a plurality of garbage collections, and log information of each garbage collection includes a garbage collection time, and includes at least one of a downtime, memory usage after garbage collection, and memory usage before garbage collection, for any one of a plurality of training time windows, determining, based on log information in the any training time window, second statistical information corresponding to the any training time window, where the second statistical information includes at least one of an average downtime in the any training time window, a change from memory usage before earliest garbage collection in the any training time window to memory usage after a last garbage collection in the any training time window, and the memory usage after the latest garbage collection in the any training time window, where the log information in the any training time window is log information in which a garbage collection time belongs to the training time window, determining, based on second statistical information corresponding to the plurality of training time windows, an anomaly degree corresponding to each of the plurality of training time windows, and determining the anomaly degree determining rule based on second statistical information and the anomaly degree that correspond to each training time window. It can be learned that, by implementing this implementation, the anomaly degree determining rule does not need to be set by a person. The memory anomaly detection device may obtain through analysis the anomaly degree determining rule based on information in the second memory log, and the anomaly degree determining rule is obtained through calculation based on a large amount of data in the second memory log. Therefore, the accuracy of the detection result can be improved by performing, using the anomaly degree determining rule, memory anomaly detection on a newly received first memory log.

Optionally, a specific implementation of determining, based on second statistical information corresponding to the plurality of training time windows, an anomaly degree corresponding to each of the plurality of training time windows may be performing clustering on the second statistical information corresponding to the plurality of training time windows, to classify the second statistical information corresponding to the plurality of training time windows into at least two clusters, obtaining, based on the second statistical information in the at least two clusters, an anomaly degree corresponding to second statistical information in each cluster in the at least two clusters, and determining, based on the anomaly degree corresponding to the second statistical information in each cluster in the at least two clusters, the anomaly degree corresponding to each training time window. An anomaly degree corresponding to any training time window is an anomaly degree corresponding to a cluster to which second statistical information corresponding to the any training time window belongs. By implementing this implementation, the anomaly degree corresponding to each of the plurality of training time windows may be accurately determined.

Optionally, a specific implementation of obtaining, based on the second statistical information in the at least two clusters, an anomaly degree corresponding to second statistical information in each cluster in the at least two clusters may be, for second statistical information in any cluster in the at least two clusters, calculating an average value for target data in the second statistical information in the any cluster, where the target data is one type of data in the second statistical information in the any cluster, and target data in each piece of second statistical information is a same type of data, and determining, based on all average values obtained through calculation, the anomaly degree corresponding to the second statistical information in each cluster in the at least two clusters.

Optionally, after the determining, based on the anomaly degree corresponding to the second statistical information in each cluster, the anomaly degree corresponding to each training time window, and before the determining the anomaly degree determining rule based on second statistical information and the anomaly degree that correspond to each training time window, the method further includes, if there is a training time window with the high anomaly degree, and maximum memory usage after garbage collection in the training time window with the high anomaly degree is less than the preset usage, and a maximum downtime in the training time window with the high anomaly degree is less than the preset downtime, adjusting an anomaly degree corresponding to the training time window with the high anomaly degree to the non-high anomaly degree.

Higher memory usage and a longer downtime indicate a higher probability of memory anomaly. Therefore, adjusting, using the memory usage after garbage collection in the training time window and the downtime in the training time window, the anomaly degree of the training time window helps improve accuracy of the anomaly degree of the training time window.

Optionally, the second statistical information further includes a quantity of garbage collections in a corresponding training time window. The anomaly degree determining rule is obtained using more parameters, and this helps improve the accuracy of the detection result.

Optionally, after the anomaly degree corresponding to the log information in the first detection time window is determined, cluster analysis may further be performed on the first statistical information and all second statistical information, and classify the first statistical information and all the second statistical information into at least two clusters, based on each cluster of information, the anomaly degrees corresponding to the first detection time window and the training time window are obtained, and the anomaly degree determining rule is updated based on the anomaly degrees corresponding to the first detection time window and the training time window. Updating the anomaly degree determining rule helps ensure the accuracy of the detection result of the anomaly degree.

Optionally, after the anomaly degree corresponding to the log information in the first detection time window is determined, if the memory usage after garbage collection is greater than the preset usage, the downtime is greater than the preset downtime, and the anomaly degree of the log information is the non-high anomaly degree, the following steps are performed performing the cluster analysis on the first statistical information and all the second statistical information, and classifying the first statistical information and all the second statistical information into the at least two clusters, obtaining, based on each cluster of information, the anomaly degrees corresponding to the first detection time window and the training time window, and updating the anomaly degree determining rule based on the anomaly degrees corresponding to the first detection time window and the training time window.

When the memory usage after garbage collection in the log information is greater than the preset usage, and the downtime is greater than the preset downtime, it indicates that memory anomaly may have occurred in this case. Therefore, the anomaly degree corresponding to the log information needs to be the high anomaly degree. However, a detection result obtained by the memory anomaly detection device according to the anomaly degree determining rule is that the anomaly degree corresponding to the log information is the non-high anomaly degree. It is clearly that the anomaly degree determining rule cannot accurately detect the anomaly degree corresponding to the log information. Therefore, in this case, the anomaly degree determining rule may be updated again. By implementing this implementation, when the anomaly degree determining rule cannot accurately detect the anomaly degree corresponding to the log information, the anomaly degree determining rule is updated. In this way, a central processing unit (CPU) resource is saved.

According to a second aspect, a memory anomaly detection device is provided. The memory anomaly detection device may perform the method in the first aspect or the possible implementations of the first aspect. The function may be implemented using hardware, or may be implemented by hardware executing corresponding software. The hardware or the software includes one or more modules corresponding to the function. The module may be software and/or hardware. For problem-resolving principles of the memory anomaly detection device and beneficial effects, refer to the first aspect or the possible implementations of the first aspect and the beneficial effects. Details are not described again.

According to a third aspect, a memory anomaly detection device is provided. The memory anomaly detection device includes a processor, a storage, a communications interface, and one or more programs. The processor, the communications interface, and the storage are connected to each other. The one or more programs are stored in the storage. The processor invokes the program stored in the storage to implement the solution in the first aspect or the possible implementations of the first aspect. For a problem-resolving implementation of the memory anomaly detection device and beneficial effects, refer to the first aspect or the possible implementations of the first aspect and the beneficial effects. Details are not described again.

According to a fourth aspect, a computer program product is provided. When the computer program product runs on a computer, the computer is enabled to perform the first aspect or any optional implementation of the first aspect.

DESCRIPTION OF EMBODIMENTS

The following further describes specific embodiments of this application in detail with reference to accompanying drawings.

For better understanding of the embodiments of this application, the following describes a communications system applicable to the embodiments of this application.

Figure 1:
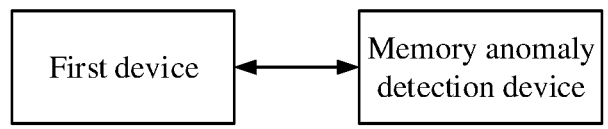
FIG. 1 is a schematic diagram of a communications system according to an embodiment of this application.

FIG. 1 is a schematic diagram of a communications system according to the embodiments of this application. As shown in FIG. 1, the communications system includes a memory anomaly detection device and at least one first device. The memory anomaly detection device may communicate with the first device. The first device stores a memory log. The first device may be a device such as a SDN controller, a log server, or a router that stores the memory log. The first device and the memory anomaly detection device may be deployed in a same device or deployed in different devices.

Figure 2:
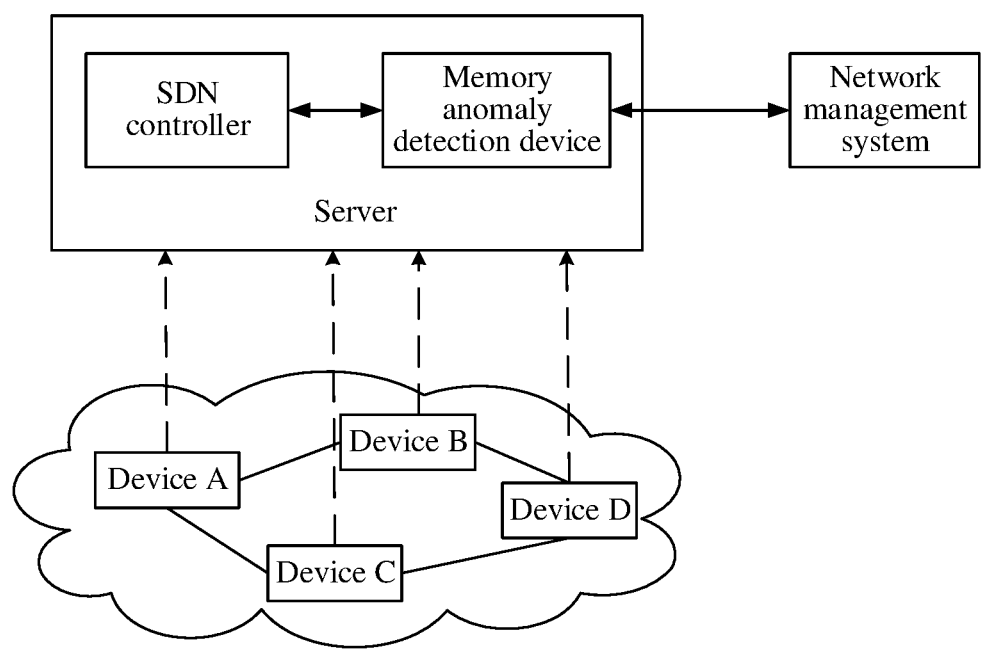
FIG. 2 is another schematic diagram of a communications system according to an embodiment of this application.

For example, as shown in FIG. 2, the communications system may be applied to an SDN network. As shown in FIG. 2, there is only one first device, and the first device is an SDN controller. In this case, the SDN controller and the memory anomaly detection device may be located at a same server. The server is connected to a network management system. A network administrator may perform comprehensive monitoring on the network using the network management system. A device A, a device B, a device C, and a device D are physical devices at a data layer, such as switches.

Figure 3:
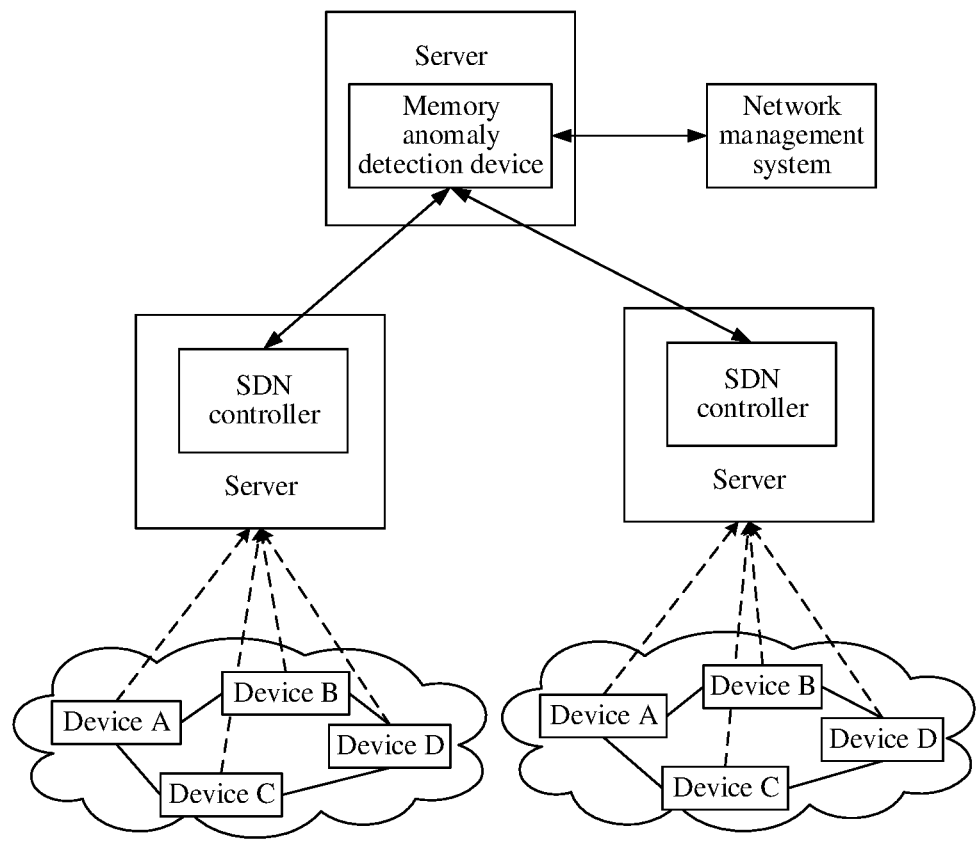
FIG. 3 is another schematic diagram of a communications system according to an embodiment of this application.

For another example, as shown in FIG. 3, there are a plurality of first devices, and the first devices are SDN controllers. In this case, the SDN controllers and the memory anomaly detection device may be located at different servers.

Figure 4:
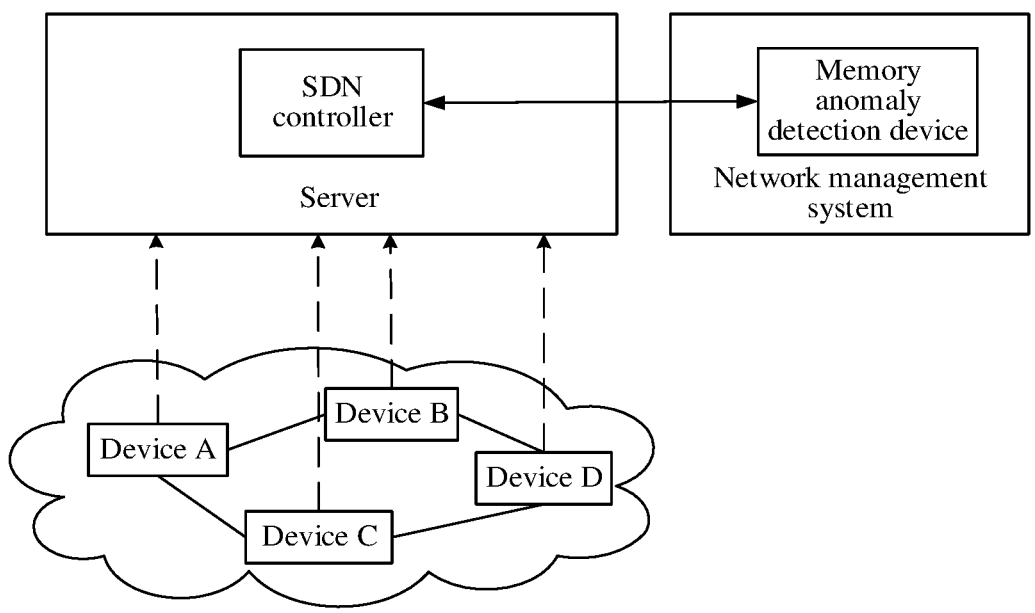
FIG. 4 is another schematic diagram of a communications system according to an embodiment of this application.

For another example, as shown in FIG. 4, the first device is an SDN controller, and the memory anomaly detection device may be located in a network management system. The communications system is applicable to a case in which there is one first device and a case in which there are a plurality of first devices. FIG. 4 is an example in which there is one first device.

Figure 5:
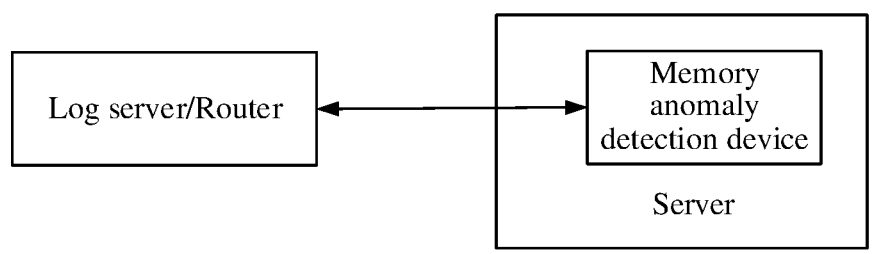
FIG. 5 is another schematic diagram of a communications system according to an embodiment of this application.

For another example, as shown in FIG. 5, the first device is a log server or a router, and the memory anomaly detection device may be located in a server.

The embodiments of this application provide a memory anomaly detection method and device, to resolve a problem that a result of memory anomaly detection is inaccurate.

The following further describes the memory anomaly detection method and device provided in this application.

Figure 6:
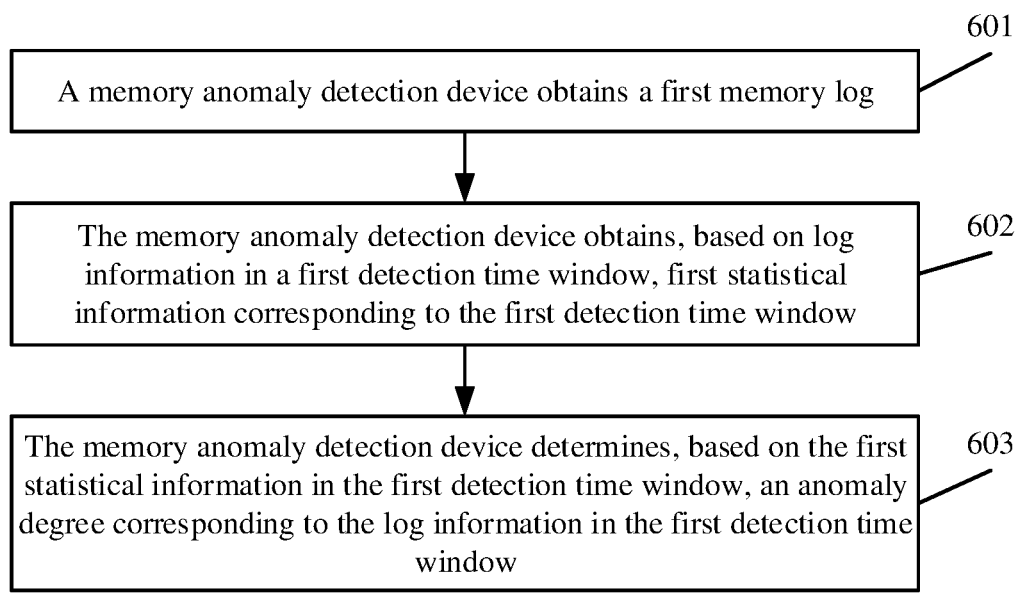
FIG. 6 is a schematic flowchart of a memory anomaly detection method according to an embodiment of this application.

FIG. 6 is a schematic flowchart of a memory anomaly detection method according to an embodiment of this application. For a communications system of the method, refer to the communications system shown in FIG. 1 to FIG. 5. As shown in FIG. 6, the memory anomaly detection method includes the following steps 601 to 604.

601. A memory anomaly detection device obtains a first memory log.

In this embodiment of this application, the first memory log is a log in a first device.

Optionally, a user may manually upload, on a related interface of the memory anomaly detection device, the first memory log from the first device to the memory anomaly detection device. Alternatively, the memory anomaly detection device may automatically obtain the first memory log from the first device. Alternatively, the first memory log may be copied from a device such as a removable hard disk or a Universal Serial Bus (USB) flash drive to the memory anomaly detection device.

Optionally, the first memory log may be a garbage collection log. For example, the first memory log may be a Java G1 garbage collector (G1GC) log, a C++ garbage collection log, or another garbage collection log. Optionally, a format of the first memory log may include but is not limited to a format such as csv, log, or txt.

In this embodiment of this application, the first memory log includes log information of a plurality of garbage collections, and log information of each garbage collection includes a garbage collection time, and includes at least one of a downtime, memory usage after garbage collection, and memory usage before garbage collection. During specific implementation, the first device may send latest generated log information to the memory anomaly detection device in real time, that is, each time one piece of log information is generated, the first device sends the log information to the memory anomaly detection device, alternatively, the first device may periodically send generated log information to the memory anomaly detection device, for example, send, every 10 minutes, log information generated in the 10 minutes to the memory anomaly detection device.

Figures 7, 8:
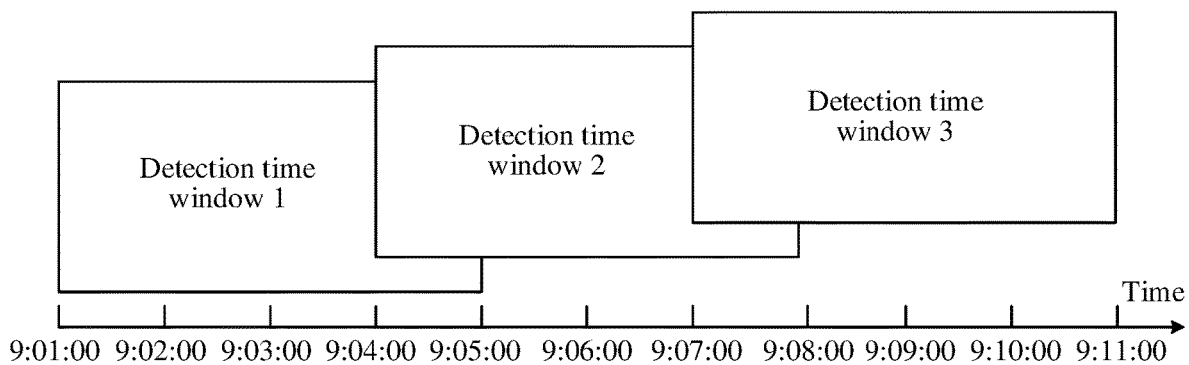
FIG. 7 is a partial schematic diagram of a first memory log according to an embodiment of this application.
FIG. 8 is a schematic diagram of a first detection time window according to an embodiment of this application.

For example, FIG. 7 is a partial schematic diagram of the first memory log. FIG. 7 is an example in which log information includes a garbage collection time, a downtime, memory usage before garbage collection, and memory usage after garbage collection. As shown in FIG. 7, "2016-10-11T22:37:00.854+0800" in a black line block in FIG. 7 is the garbage collection time, "0.0000670 second" is the downtime, content described after a field "Heap before" is the memory usage before garbage collection, and content described after a field "Heap after" is the memory usage after garbage collection.

For example, if garbage collection is performed for three times, the first memory log records log information 1 of a first garbage collection, and the log information 1 includes a garbage collection time 1, and at least one of a downtime 1, memory usage 1 after garbage collection, and memory usage 1 before garbage collection. The first memory log further records log information 2 of a second garbage collection, and the log information 2 includes a garbage collection time 2, and at least one of a downtime 2, memory usage 2 after garbage collection, and memory usage 2 before garbage collection. The first memory log further records log information 3 of a third garbage collection, and the log information 3 includes a garbage collection time 3, and at least one of a downtime 3, memory usage 3 after garbage collection, and memory usage 3 before garbage collection.

Optionally, after obtaining the first memory log, the memory anomaly detection device may extract log information of at least one garbage collection from the first memory log. The memory anomaly detection device may extract log information of all or some of the at least one garbage collection from the first memory log. For example, the first memory log includes log information of ten garbage collections, and the memory anomaly detection device may obtain the log information of the ten garbage collections or obtain log information of last five garbage collections.

Optionally, the memory anomaly detection device may extract, based on a string format of the first memory log, the log information through parsing. Alternatively, the memory anomaly detection device may extract, based on a relative location of the log information in the first memory log and a string format of the first memory log, the log information through parsing. The relative location of the log information is information about relative locations of the garbage collection time, the downtime, the memory usage after garbage collection, and the memory usage before garbage collection that are in the log information. Using the relative location of the log information, the log information may be more accurately extracted through parsing.

602. The memory anomaly detection device obtains, based on log information in a first detection time window, first statistical information corresponding to the first detection time window.

In this embodiment of this application, the extracted log information belongs to a detection time window. Log information in any detection time window is log information in which a garbage collection time belongs to the any detection time window. The first detection time window is any one of detection time windows, and the log information in the first detection time window is log information in which a garbage collection time belongs to the first detection time window. The detection time window has a fixed window width and a fixed gradient. Optionally, the first detection time window may be a detection time window that includes the latest generated log information before step 602 is performed, that is, a latest detection time window.

For example, as shown in FIG. 8, there are three detection time windows, and for each detection time window, a window width is 4 minutes and a gradient is 3 minutes. The memory anomaly detection device extracts seven pieces of log information from the first memory log, which are log information 1 to log information 7 respectively. The log information 1 includes a garbage collection time 1 (which is 9:01:00), a downtime 1 (0.01 second), memory usage 1 (90%) before garbage collection, and memory usage 1 (45%) after garbage collection. Log information 2 includes a garbage collection time 2 (which is 9:03:00), a downtime 2 (0.01 second), memory usage 2 (85%) before garbage collection, and memory usage 2 (55%) after garbage collection. Log information 3 includes a garbage collection time 3 (which is 9:05:00), a downtime 3 (0.01 second), memory usage 3 (90%) before garbage collection, and memory usage 3 (65%) after garbage collection. Log information 4 includes a garbage collection time 4 (which is 9:06:00), a downtime 4 (1 second), memory usage 4 (82%) before garbage collection, and memory usage 4 (70%) after garbage collection. Log information 5 includes a garbage collection time 5 (which is 9:08:00), a downtime 5 (2 seconds), memory usage 5 (90%) before garbage collection, and memory usage 5 (75%) after garbage collection. Log information 6 includes a garbage collection time 6 (which is 9:09:00), a downtime 6 (3 seconds), memory usage 6 (85%) before garbage collection, and memory usage 6 (80%) after garbage collection. The log information 7 includes a garbage collection time 7 (which is 9:10:00), a downtime 2 (4 seconds), memory usage 7 (85%) before garbage collection, and memory usage 7 (85%) after garbage collection. A detection time window 1 corresponds to 9:00:00 to 9:05:00, a detection time window 2 corresponds to 9:04:00 to 9:08:00, and a detection time window 3 corresponds to 9:07:00 to 9:11:00. The garbage collection time 1 to the garbage collection time 3 in the log information 1 to the log information 3 all belong to the detection time window 1, the garbage collection time 3 to the garbage collection time 5 in the log information 3 to the log information 5 all belong to the detection time window 2, and the garbage collection time 5 to the garbage collection time 7 in the log information 5 to the log information 7 all belong to the detection time window 3. Therefore, the detection time window 1 includes the log information 1 to the log information 3, the detection time window 2 includes the log information 3 to the log information 5, and the detection time window 3 includes the log information 5 to the log information 7.

The first detection time window may be the detection time window 1, the detection time window 2, or the detection time window 3.

In this embodiment of this application, the first statistical information corresponding to the first detection time window includes at least one of an average downtime in the first detection time window, a change (which may be an amount of a change or a rate of a change) from memory usage before earliest garbage collection in the first detection time window to memory usage after latest garbage collection in the first detection time window, and the memory usage after the latest garbage collection in the first detection time window. The memory usage after the latest garbage collection in the first detection time window corresponds to latest garbage collection time in the first detection time window, and the memory usage before the earliest garbage collection in the first detection time window corresponds to earliest garbage collection time in the first detection time window.

For example, if the log information in the first detection time window includes a garbage collection time and a downtime, the first statistical information may include the average downtime. If the log information in the first detection time window includes a garbage collection time and memory usage after garbage collection, the first statistical information may include the memory usage after the latest garbage collection in the first detection time window. If the log information in the first detection time window includes the garbage collection time, memory usage before garbage collection, and the memory usage after garbage collection, the first statistical information may include the change from the memory usage before the earliest garbage collection in the first detection time window to the memory usage after the latest garbage collection in the first detection time window, or may further include the memory usage after the latest garbage collection in the first detection time window.

For example, the first detection time window is the foregoing detection time window 1. The detection time window 1 includes the garbage collection time 1 to the garbage collection time 3. An average value of the garbage collection time 1 to the garbage collection time 3 is 0.01 second. Therefore, an average downtime in the first detection time window is 0.01 second.

The latest garbage collection time in the first detection time window is the garbage collection time 3, and the garbage collection time 3 corresponds to the memory usage 3 after garbage collection. Therefore, the memory usage after the latest garbage collection in the first detection time window is the memory usage 3 after garbage collection.

The earliest garbage collection time in the first detection time window is the garbage collection time 1, and the garbage collection time 1 corresponds to the memory usage 1 before garbage collection. Therefore, the memory usage before the earliest garbage collection in the first detection time window is the memory usage 1 before garbage collection. Therefore, the change from the memory usage before the earliest garbage collection in the first detection time window to the memory usage after the latest garbage collection in the first detection time window is a change from the memory usage 1 (that is, 90%) before garbage collection to the memory usage 3 (that is, 65%) after garbage collection, that is, 25% (an amount of the change is used as an example).

Therefore, the first statistical information corresponding to the first detection time window includes the average downtime of 0.01 second, that the change of the memory usage before the earliest garbage collection in the first detection time window is the change 25% from the memory usage 1 before garbage collection to the memory usage 3 after garbage collection, and the memory usage after the latest garbage collection in the first detection time window, that is, the memory usage 3 (65%) after garbage collection.

A calculation principle of first statistical information corresponding to another detection time window is the same as a calculation principle of the detection time window 1. Details are not described herein again.

603. The memory anomaly detection device determines, based on the first statistical information in the first detection time window, an anomaly degree corresponding to the log information in the first detection time window.

The anomaly degree corresponding to the log information may be used to represent an anomaly degree of memory in a garbage collection time corresponding to the log information. Optionally, one detection time window includes log information of one garbage collection, or may include log information of a plurality of garbage collections. That is, the first detection time window includes log information of one garbage collection, or may include log information of a plurality of garbage collections.

It can be learned that, by implementing the method described in FIG. 6, the memory anomaly detection device does not determine the anomaly degree of the log information based on memory usage after one garbage collection, but determines the anomaly degree of the log information based on statistical information of the log information in a period of time, that is, determines, based on the first statistical information corresponding to the first detection time window, the anomaly degree corresponding to the log information in the first detection time window. The anomaly degree of the log information may be used to represent the anomaly degree of the memory in the garbage collection time corresponding the log information. Therefore, accuracy of detecting memory anomaly is relatively high.

In addition, in other approaches, the memory anomaly degree is determined based on only memory usage after garbage collection of one garbage collection, and in this case, the accuracy of detecting the memory anomaly is relatively low. However, in this application, the log information includes the memory usage after garbage collection, and may further include the downtime and the memory usage before garbage collection. Therefore, the memory anomaly detection device may determine, based on log information that includes a plurality of pieces of dimension information in a period of time, the anomaly degree corresponding to the memory. In this way, the anomaly degree corresponding to the memory may be more accurately determined.

Optionally, a specific implementation in which the memory anomaly detection device determines, based on the first statistical information corresponding to the first detection time window, the anomaly degree corresponding to the log information in the first detection time window may be determining, by the memory anomaly detection device based on the first statistical information, the anomaly degree corresponding to the first detection time window, and determining, by the memory anomaly detection device, the anomaly degree corresponding to the first detection time window as an anomaly degree corresponding to first log information in the first detection time window.

Optionally, the first log information is log information that belongs to the first detection time window and does not belong to a detection time window before the first detection time window. In other words, an anomaly degree corresponding to log information jointly owned by a plurality of detection time windows is an anomaly degree of an earliest detection time window in the plurality of detection time windows.

Figure 9:
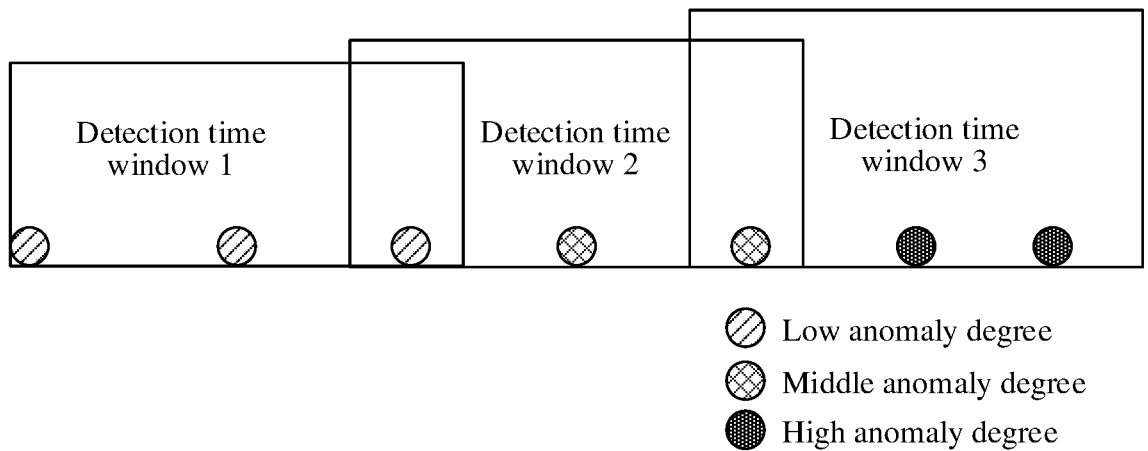
FIG. 9 and FIG. 10 are schematic diagrams of an anomaly degree of log information in a first detection time window according to an embodiment of this application.

For example, the first detection time window is the detection time window 1, the detection time window 2, or the detection time window 3. As shown in FIG. 9, the memory anomaly detection device determines a low anomaly degree corresponding to the detection time window 1 as anomaly degrees corresponding to the log information 1, the log information 2, and the log information 3. Because both the detection time window 1 and the detection time window 2 include the log information 3, the memory anomaly detection device determines only a middle anomaly degree corresponding to the detection time window 2 as anomaly degrees corresponding to the log information 4 and the log information 5. Likewise, because both the detection time window 2 and the detection time window 3 include the log information 5, the memory anomaly detection device determines only a high anomaly degree corresponding to the detection time window 3 as anomaly degrees corresponding to the log information 6 and the log information 7.

Figure 10:
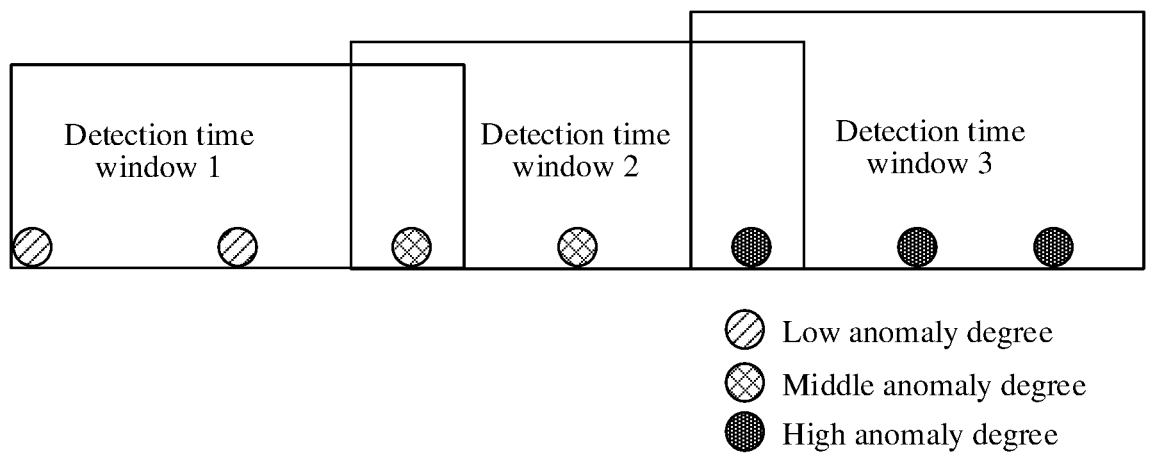

Optionally, the first log information is any log information in the first detection time window. In other words, the anomaly degree corresponding to the log information jointly owned by the plurality of detection time windows is an anomaly degree of a latest detection time window in the plurality of detection time windows. As shown in FIG. 10, the first detection time window is the detection time window 1, the detection time window 2, or the detection time window 3. The memory anomaly detection device determines the low anomaly degree corresponding to the detection time window 1 as the anomaly degrees corresponding to the log information 1, the log information 2, and the log information 3. The memory anomaly detection device determines the middle anomaly degree corresponding to the detection time window 2 as anomaly degrees corresponding to the log information 3, the log information 4, and the log information 5. The memory anomaly detection device determines the high anomaly degree corresponding to the detection time window 3 as anomaly degrees corresponding to the log information 5, the log information 6, and the log information 7. Therefore, finally, the anomaly degree corresponding to the log information 3 is the middle anomaly degree corresponding to the detection time window 2. Finally, the anomaly degree corresponding to the log information 5 is the high anomaly degree corresponding to the detection time window 3.

Optionally, after the memory anomaly detection device determines the anomaly degree corresponding to the log information in the first detection time window, if there is log information with a high anomaly degree in the first detection time window, memory usage after garbage collection in the log information with the high anomaly degree is less than preset usage, and a downtime in the log information with the high anomaly degree is less than a preset downtime, the memory anomaly detection device adjusts an anomaly degree corresponding to the log information with the high anomaly degree to a non-high anomaly degree (for example, a low anomaly degree or a middle anomaly degree). If the memory usage after garbage collection in the log information with the high anomaly degree is greater than the preset usage, and the downtime in the log information with the high anomaly degree is greater than the preset downtime, the anomaly degree corresponding to the log information with the high anomaly degree is maintained as the high anomaly degree.

For example, if the log information 1 in the first detection time window corresponds to a high anomaly degree, the memory usage after garbage collection included in the log information 1 is 74%, and the downtime included in the log information 1 is 1.5 seconds. If the preset usage is 80%, and the preset downtime is 2 seconds, because the memory usage after garbage collection included in the log information 1 is not greater than the preset usage, and the downtime in the log information 1 is less than the preset downtime, the memory anomaly detection device adjusts the anomaly degree of the log information 1 to a middle anomaly degree.

Higher memory usage and a longer downtime cause a higher probability of memory anomaly. Therefore, adjusting, using the memory usage after garbage collection in the log information and the downtime in the log information, the anomaly degree of the log information helps improve accuracy of the anomaly degree of the log information.

Optionally, the first statistical information further includes a quantity of garbage collections in the first detection time window. The memory anomaly degree is detected using more parameters, and this helps improve accuracy of a detection result. Statistical information corresponding to any other detection time window also includes a quantity of garbage collections in the any detection time window.

Optionally, if the log information with the high anomaly degree continually occurs for a preset quantity of times in a preset time period, the memory anomaly detection device may raise an alarm for the memory anomaly. By implementing this implementation, the alarm can be raised for the memory anomaly in a timely manner such that a measure can be taken to resolve the memory anomaly in the timely manner.

For example, if there are the log information 1 to the log information 4 in five consecutive minutes, log information 1 to log information 4 all correspond to the high anomaly degree, the log information 1 includes the garbage collection time 1 (9:01:00), the log information 2 includes the garbage collection time 2 (9:02:00), the log information 3 includes the garbage collection time 3 (9:03:00), and the log information 4 includes the garbage collection time 3 (9:04:00), there are four garbage collection times at which the high anomaly degree continually occur in the five minutes. If the preset time period is 5 minutes and the preset quantity of times is 4, the memory anomaly detection device raises the alarm for the memory anomaly.

Optionally, a specific implementation in which the memory anomaly detection device determines, based on the first statistical information corresponding to the first detection time window, the anomaly degree of the log information in the first detection time window may be determining, by the memory anomaly detection device according to an anomaly degree determining rule and based on the first statistical information corresponding to the first detection time window, the anomaly degree of the log information in the first detection time window. The anomaly degree determining rule is obtained in advance based on a garbage collection time, and at least one of a downtime, memory usage after garbage collection, and memory usage before garbage collection that are included in a second memory log.

The anomaly degree determining rule is obtained through analyzing and calculation based on the garbage collection time, the downtime, and the memory usage after garbage collection that are included in the second memory log. The anomaly degree determining rule is not a rule set by a person. Therefore, by implementing this implementation, the accuracy of the detection result of the memory anomaly degree is improved.

Optionally, the second memory log may be a memory log received from the first device, or may be a memory log received from another device. Optionally, the second memory log may be a garbage collection log. For example, the second memory log may be a Java G1GC log, a C++ garbage collection log, or another garbage collection log. Optionally, the second memory log and the first memory log are memory logs of a same type. For example, both the second memory log and the first memory log are Java G1GC logs, and both the second memory log and the first memory log are C++ garbage collection logs. Optionally, a format of the second memory log may include but is not limited to a format such as csv, log, or txt.

Optionally, the anomaly degree determining rule includes conditions that correspond to different anomaly degrees. A specific implementation in which the memory anomaly detection device determines, according to the anomaly degree determining rule and the first statistical information corresponding to the first detection time window, the anomaly degree of the log information in the first detection time window may be determining, by the memory anomaly detection device, an anomaly degree corresponding to a condition met by the first statistical information of the first detection time window as an anomaly degree of the first detection time window, and determining, based on the anomaly degree corresponding to the first detection time window, the anomaly degree corresponding to the log information in the first detection time window. For example, the anomaly degree corresponding to the first detection time window is determined as the anomaly degree corresponding to the first log information in the first detection time window. The first log information is any log information in the first detection time window. Alternatively, the first log information is the log information that belongs to the first detection time window and does not belong to the detection time window before the first detection time window.

For example, the anomaly degree determining rule is as follows. If the average downtime in the first statistical information falls within a closed range of 0 to 2 seconds, the memory usage that is included in the first statistical information and that is after the latest garbage collection in the first detection time window falls within a closed range of 60% to 70%, and the amount that is of the change from the memory usage before the earliest garbage collection in the first detection time window to the memory usage after the latest garbage collection in the first detection time window and that is included in the first statistical information falls within a closed range of 20% to 30%, it is determined that the anomaly degree corresponding to the first detection time window is the low anomaly degree. If the average downtime in the first statistical information falls within the closed range of 0 to 2 seconds, the memory usage that is included in the first statistical information and that is after the latest garbage collection in the first detection time window is greater than 70% and is less than or equal to 80%, and the amount that is of the change from the memory usage before the earliest garbage collection in the first detection time window to the memory usage after the latest garbage collection in the first detection time window and that is included in the first statistical information is greater than 10% and is less than 20%, it is determined that the anomaly degree corresponding to the first detection time window is the middle anomaly degree. If the average downtime in the first statistical information is greater than 2 seconds, the memory usage that is included in the first statistical information and that is after the latest garbage collection in the first detection time window is greater than 80%, and the amount that is of the change from the memory usage before the earliest garbage collection in the first detection time window to the memory usage after the latest garbage collection in the first detection time window and that is included in the first statistical information is greater than or equal to 0 and is less than or equal to 10%, it is determined that the anomaly degree corresponding to the first detection time window is the high anomaly degree. In another case, it is determined that there is no anomaly.

Figure 11:
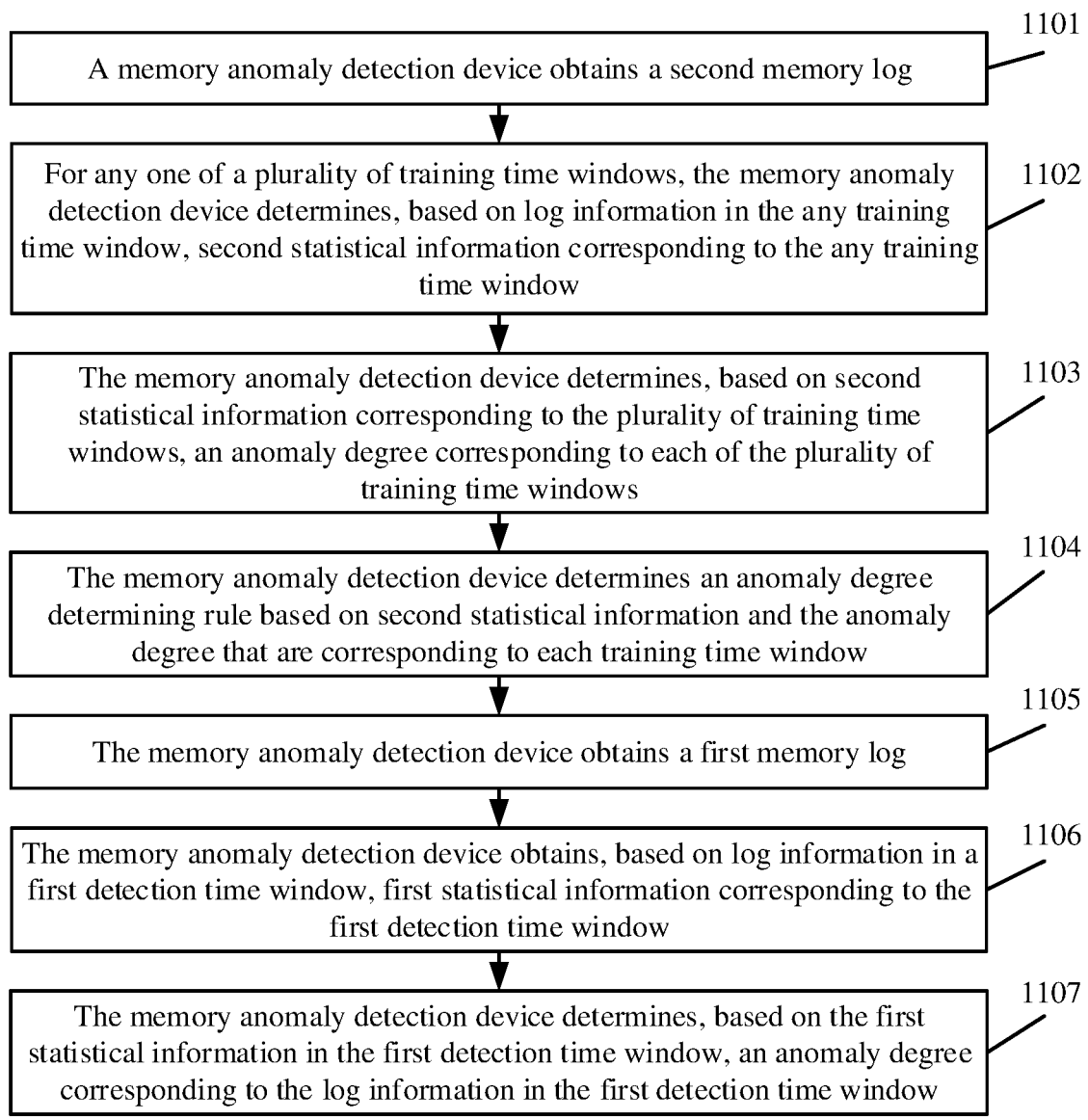
FIG. 11 is a schematic flowchart of another memory anomaly detection method according to an embodiment of this application.

Optionally, as shown in FIG. 11, before obtaining a first memory log, a memory anomaly detection device may further perform the following steps 1101 to 1107.

1101. The memory anomaly detection device obtains a second memory log.

The second memory log includes log information of a plurality of garbage collections, and log information of each garbage collection includes a garbage collection time, and includes at least one of a downtime, memory usage after garbage collection, and memory usage before garbage collection.

For example, if garbage collection is performed for three times, the second memory log records log information 1 of a first garbage collection, and the log information 1 includes a garbage collection time 1, and at least one of a downtime 1, memory usage 1 after garbage collection, and memory usage 1 before garbage collection. Further, the second memory log records log information 2 of a second garbage collection, and the log information 2 includes a garbage collection time 2, and at least one of a downtime 2, memory usage 2 after garbage collection, and memory usage 2 before garbage collection. Further, the second memory log records log information 3 of a third garbage collection, and the log information 3 includes a garbage collection time 3, and at least one of a downtime 3, memory usage 3 after garbage collection, and memory usage 3 before garbage collection.

In this embodiment of this application, after obtaining the second memory log, the memory anomaly detection device may extract log information of at least two garbage collections from the second memory log. The memory anomaly detection device may extract log information of all or some of the at least two garbage collections from the second memory log. For example, the second memory log includes log information of ten garbage collections, and the memory anomaly detection device may obtain the log information of the ten garbage collections or obtain log information of last five garbage collections.

Optionally, the memory anomaly detection device may extract, based on a string format of the second memory log, the log information through parsing. Alternatively, the memory anomaly detection device may extract, based on a relative location of the log information in the second memory log and a string format of the second memory log, the log information through parsing. The relative location of the log information is information about relative locations of the garbage collection time, the downtime, the memory usage after garbage collection, and the memory usage before garbage collection that are in the log information. Using the relative location of the log information, the log information may be more accurately extracted through parsing.

1102. For any one of a plurality of training time windows, the memory anomaly detection device determines, based on log information in the any training time window, second statistical information corresponding to the any training time window.

In this embodiment of this application, the log information extracted from the second memory log belongs to a training time window. Log information in any training time window is log information in which a garbage collection time belongs to the any training time window. For example, log information in a training time window 1 is log information in which a garbage collection time belongs to the training time window 1. Log information in a training time window 2 is log information in which a garbage collection time belongs to the training time window 2. The training time window has a fixed window width and a fixed gradient. The training time window and a detection time window have a same window width, and the training time window and the detection time window have a same gradient.

The second statistical information corresponding to the any training time window includes at least one of an average downtime in the any training time window, a change from memory usage before earliest garbage collection in the any training time window to memory usage after a last garbage collection in the any training time window, and the memory usage after the latest garbage collection in the any training time window. The memory usage after the latest garbage collection in the any training time window corresponds to latest garbage collection time in the any training time window, and the memory usage before the earliest garbage collection in the any training time window corresponds to earliest garbage collection time in the any training time window.

For example, there are three training time windows, and for each training time window, a window width is 4 minutes and a gradient is 3 minutes. The memory anomaly detection device extracts seven pieces of log information from the second memory log, which are log information 1 to log information 7 respectively. The log information 1 includes a garbage collection time 1 (which is 9:01:00), a downtime 1 (0.01 second), memory usage 1 (90%) before garbage collection, and memory usage 1 (45%) after garbage collection. Log information 2 includes a garbage collection time 2 (which is 9:03:00), a downtime 2 (0.01 second), memory usage 2 (85%) before garbage collection, and memory usage 2 (55%) after garbage collection. Log information 3 includes a garbage collection time 3 (which is 9:05:00), a downtime 3 (0.01 second), memory usage 3 (90%) before garbage collection, and memory usage 3 (65%) after garbage collection. Log information 4 includes a garbage collection time 4 (which is 9:06:00), a downtime 4 (1 second), memory usage 4 (82%) before garbage collection, and memory usage 4 (70%) after garbage collection. Log information 5 includes a garbage collection time 5 (which is 9:08:00), a downtime 5 (2 seconds), memory usage 5 (90%) before garbage collection, and memory usage 5 (75%) after garbage collection. Log information 6 includes a garbage collection time 6 (which is 9:09:00), a downtime 6 (3 seconds), memory usage 6 (85%) before garbage collection, and memory usage 6 (80%) after garbage collection. The log information 7 includes a garbage collection time 7 (which is 9:10:00), a downtime 2 (4 seconds), memory usage 7 (85%) before garbage collection, and memory usage 7 (85%) after garbage collection. A training time window 1 corresponds to 9:00:00 to 9:05:00, a training time window 2 corresponds to 9:04:00 to 9:08:00, and a training time window 3 corresponds to 9:07:00 to 9:11:00. The garbage collection time 1 to the garbage collection time 3 in the log information 1 to the log information 3 all belong to the training time window 1, the garbage collection time 3 to the garbage collection time 5 in the log information 3 to the log information 5 all belong to the training time window 2, and the garbage collection time 5 to the garbage collection time 7 in the log information 5 to the log information 7 all belong to the training time window 3. Therefore, the training time window 1 includes the log information 1 to the log information 3, the training time window 2 includes the log information 3 to the log information 5, and the training time window 3 includes the log information 5 to the log information 7.

The memory anomaly detection device determines, based on the log information 1 to the log information 3 in the training time window 1, second statistical information 1 corresponding to the training time window 1, determines, based on the log information 3 to the log information 5 in the training time window 2, second statistical information 2 corresponding to the training time window 2, and determines, based on the log information 5 to the log information 7 in the training time window 3, second statistical information 3 corresponding to the training time window 3.

The second statistical information 1 corresponding to the training time window 1 includes an average downtime (that is, 0.01 second) of the garbage collection time 1 to the garbage collection time 3 in the training time window 1, a change (that is, 25%) between memory usage after a last garbage collection in the training time window 1 and memory usage before earliest garbage collection in the training time window 1, and the memory usage (that is, 65%) after the last garbage collection in the training time window 1.

The second statistical information 2 corresponding to the training time window 2 includes an average downtime (that is, approximately equal to 1 second) in the training time window 2, a change (that is, 15%) between memory usage after a last garbage collection in the training time window 2 and memory usage before earliest garbage collection in the training time window 2, and the memory usage (that is, 75%) of the last garbage collection in the training time window 2.

The second statistical information 3 corresponding to the training time window 3 includes an average downtime (that is, 3 seconds) in the training time window 3, a change (that is, 5%) between memory usage after a last garbage collection in the training time window 3 and memory usage before earliest garbage collection in the training time window 3, and the memory usage (that is, 85%) of the last garbage collection in the training time window 3.

1103. The memory anomaly detection device determines, based on second statistical information corresponding to the plurality of training time windows, an anomaly degree corresponding to each of the plurality of training time windows.

For example, there are the training time window 1 to the training time window 3, the memory anomaly detection device determines, based on the second statistical information 1 corresponding to the training time window 1, the second statistical information 2 corresponding to the training time window 2, and the second statistical information 3 corresponding to the training time window 3, an anomaly degree corresponding to each training time window in the training time window 1 to the training time window 3.

Optionally, a specific implementation in which the memory anomaly detection device determines, based on the second statistical information corresponding to the plurality of training time windows, the anomaly degree corresponding to each of the plurality of training time windows may be performing clustering, by the memory anomaly detection device, on the second statistical information corresponding to the plurality of training time windows, to classify the second statistical information corresponding to the plurality of training time windows into at least two clusters, obtaining, by the memory anomaly detection device based on the second statistical information in the at least two clusters, an anomaly degree corresponding to the second statistical information in each cluster in the at least two clusters, and determining, by the memory anomaly detection device based on the anomaly degree corresponding to the second statistical information in each cluster in the at least two clusters, the anomaly degree corresponding to each training time window. An anomaly degree corresponding to any training time window is an anomaly degree corresponding to a cluster to which second statistical information corresponding to the any training time window belongs.

Clustering means that data is classified into different clusters. Therefore, objects in a same cluster are very similar, and objects in different clusters are very different. Optionally, a clustering algorithm used to perform clustering may be a Kmeans algorithm. Optionally, a quantity of clustered clusters may be preset. The quantity of clustered clusters is equal to a quantity of types of anomaly degrees. For example, there are three types of anomaly degrees, which are a low anomaly degree, a middle anomaly degree, and a high anomaly degree respectively. The quantity of clustered clusters may be preset to three, and finally, three clusters of second statistical information are clustered such that each cluster of second statistical information may be corresponding to one type of anomaly degree.

Optionally, a specific implementation in which the memory anomaly detection device obtains, based on the second statistical information in the at least two clusters, the anomaly degree corresponding to the second statistical information in each cluster in the at least two clusters may be, for second statistical information in any cluster in the at least two clusters, calculating an average value for target data in the second statistical information in the any cluster, where the target data is one type of data in the second statistical information in the any cluster, and target data in each piece of second statistical information is a same type of data, and determining, based on all average values obtained through calculation, the anomaly degree corresponding to the second statistical information in each cluster in the at least two clusters.

In an embodiment, when the second statistical information includes one or more types of data, for second statistical information in any cluster in the at least two clusters, the memory anomaly detection device calculates an average value for only one type of data in the second statistical information in the any cluster, and then determines, based on all average values obtained through calculation, the anomaly degree corresponding to the second statistical information in each cluster in the at least two clusters. For example, when the second statistical information includes only the memory usage after the latest garbage collection, for second statistical information in any cluster in the at least two clusters, the memory anomaly detection device calculates an average value for the memory usage after the latest garbage collection in the second statistical information in the any cluster, and then determines, based on all average values obtained through calculation, the anomaly degree corresponding to the second statistical information in each cluster in the at least two clusters.

For another example, the second statistical information in the at least two clusters are second statistical information in two clusters. When the second statistical information includes the average downtime and the memory usage after the latest garbage collection, for second statistical information in a first cluster, the memory anomaly detection device calculates an average value 1 for average downtimes in the second statistical information in the first cluster, and for second statistical information in a second cluster, the memory anomaly detection device calculates an average value 2 for average downtimes in the second statistical information in the second cluster, and then determines, based on the average value 1 and the average value 2 that are obtained through calculation, the anomaly degree corresponding to the second statistical information in each cluster in the at least two clusters. In other words, both of target data in the statistical information in the first cluster and the statistical information in the second cluster are the average downtimes. Alternatively, for second statistical information in any cluster in the at least two clusters, the memory anomaly detection device calculates an average value for memory usage after latest garbage collection in the second statistical information in the any cluster, and then determines, based on all average values obtained through calculation, the anomaly degree corresponding to the second statistical information in each cluster in the at least two clusters. In other words, both of the target data in the statistical information in the first cluster and the statistical information in the second cluster are average values of the memory usage after the latest garbage collection.

Optionally, if the target data is the average downtime or the memory usage after the latest garbage collection, the average value of the target data in the second statistical information in the first cluster in the at least two clusters is less than the average value of the target data in the second statistical information in the second cluster, and an anomaly degree corresponding to the second statistical information in the first cluster is lower than an anomaly degree corresponding to the second statistical information in the second cluster. In other words, a larger average value that is obtained through calculation and that is of second statistical information in a specific cluster indicates a higher anomaly degree corresponding to the second statistical information in the cluster.

Optionally, if target data in the second statistical information corresponding to the any training time window is the change from the memory usage before the earliest garbage collection in the any training time window to the memory usage after the last garbage collection in the any training time window, the average value of the target data in the second statistical information in the first cluster in the at least two clusters is less than the average value of the target data in the second statistical information in the second cluster, and the anomaly degree corresponding to the second statistical information in the first cluster is higher than the anomaly degree corresponding to the second statistical information in the second cluster. In other words, the larger average value that is obtained through calculation and that is of the second statistical information in the specific cluster indicates a lower anomaly degree corresponding to the second statistical information in the cluster.

For example, there are six training time windows, which are a training time window 1 to a training time window 6 respectively. The training time window 1 corresponds to second statistical information 1, a training time window 2 corresponds to second statistical information 2, a training time window 3 corresponds to second statistical information 3, a training time window 4 corresponds to second statistical information 4, a training time window 5 corresponds to second statistical information 5, and the training time window 6 corresponds to second statistical information 6.

An anomaly degree includes the low anomaly degree, the middle anomaly degree, and the high anomaly degree. The quantity of clustered clusters is preset to three. Cluster analysis is performed on the second statistical information corresponding to the training time window 1 to the training time window 6, and the second statistical information 1 and the second statistical information 2 that corresponds to the training time window 1 and the training time window 2 are classified into a first cluster. The second statistical information 3 and the second statistical information 4 that corresponds to the training time window 3 and the training time window 4 are classified into a second cluster. The second statistical information 5 and the second statistical information 6 that corresponds to the training time window 5 and the training time window 6 are classified into a third cluster.

Using an example in which the second statistical information corresponding to the any training time window includes the average downtime (in other words, in a case in which the second statistical information corresponding to the any training time window includes only the average downtime, or in a case in which the second statistical information corresponding to the any training time window includes other data in addition to the average downtime), anomaly degrees corresponding to the training time window 1 to the training time window 6 may be determined in the following manner. The memory anomaly detection device calculates an average value for average downtimes included in the second statistical information 1 and the second statistical information 2, and obtains that the average value is 1 second. The memory anomaly detection device calculates an average value for average downtimes included in the second statistical information 3 and the second statistical information 4, and obtains that the average value is 2 seconds. The memory anomaly detection device calculates an average value for average downtimes included in the second statistical information 5 and the second statistical information 6, and obtains that the average value is 3 seconds. A longer downtime indicates a higher anomaly degree. Therefore, it may be determined that the second statistical information in the first cluster corresponds to the low anomaly degree, it may be determined that the second statistical information in the second cluster corresponds to the middle anomaly degree, and it may be determined that the second statistical information in the third cluster corresponds to the high anomaly degree. The memory anomaly detection device determines the low anomaly degree corresponding to the second statistical information in the first cluster as anomaly degrees corresponding to the training time window 1 and the training time window 2. The memory anomaly detection device determines the middle anomaly degree corresponding to the second statistical information in the second cluster as anomaly degrees corresponding to the training time window 3 and the training time window 4. The memory anomaly detection device determines the high anomaly degree corresponding to the second statistical information in the third cluster as anomaly degrees corresponding to the training time window 5 and the training time window 6.

Using an example in which the second statistical information corresponding to the any training time window includes the memory usage after the last garbage collection in the any training time window (in other words, in a case in which the second statistical information corresponding to the any training time window includes only the memory usage after the last garbage collection in the any training time window, or in a case in which the second statistical information corresponding to the any training time window includes other data in addition to the memory usage after the last garbage collection in the any training time window), the anomaly degrees corresponding to the training time window 1 to the training time window 6 may be determined in the following manner.

The memory anomaly detection device calculates an average value for memory usage after latest garbage collection included in the second statistical information 1 and the second statistical information 2, and obtains that the average value is 65%. The memory anomaly detection device calculates an average value for memory usage after latest garbage collection included in the second statistical information 3 and the second statistical information 4, and obtains that the average value is 75%. The memory anomaly detection device calculates an average value for the memory usage after latest garbage collection included in the second statistical information 5 and the second statistical information 6, and obtains that the average value is 85%. Larger memory usage after garbage collection indicates a higher anomaly degree. Therefore, it may be determined that the second statistical information in the first cluster corresponds to the low anomaly degree, it may be determined that the second statistical information in the second cluster corresponds to the middle anomaly degree, and it may be determined that the second statistical information in the third cluster corresponds to the high anomaly degree. The memory anomaly detection device determines the low anomaly degree corresponding to the second statistical information in the first cluster as the anomaly degrees corresponding to the training time window 1 and the training time window 2. The memory anomaly detection device determines the middle anomaly degree corresponding to the second statistical information in the second cluster as the anomaly degrees corresponding to the training time window 3 and the training time window 4. The memory anomaly detection device determines the high anomaly degree corresponding to the second statistical information in the third cluster as the anomaly degrees corresponding to the training time window 5 and the training time window 6.

Using an example in which the second statistical information corresponding to the any training time window includes the change from the memory usage before the earliest garbage collection in the any training time window to the memory usage after the last garbage collection in the any training time window (in other words, in a case in which the second statistical information corresponding to the any training time window includes only the change from the memory usage before the earliest garbage collection in the any training time window to the memory usage after the last garbage collection in the any training time window, or in a case in which the second statistical information corresponding to the any training time window includes other data in addition to the change from the memory usage before the earliest garbage collection in the any training time window to the memory usage after the last garbage collection in the any training time window), the anomaly degrees corresponding to the training time window 1 to the training time window 6 may be determined in the following manner.

For example, the memory anomaly detection device calculates an average value for changes that are included in the second statistical information 1 and the second statistical information 2 and that are between memory usage after a last garbage collection and memory usage before earliest garbage collection that are in a same training time window, and obtains that the average value is 25%. The memory anomaly detection device calculates an average value for changes that are included in the second statistical information 3 and the second statistical information 4 and that are between memory usage after a last garbage collection and memory usage before earliest garbage collection that are in a same training time window, and obtains that the average value is 15%. The memory anomaly detection device calculates an average value for changes that are included in the second statistical information 5 and the second statistical information 6 and that are between memory usage after a last garbage collection and memory usage before earliest garbage collection that are in a same training time window, and obtains that the average value is 5%. A smaller change from memory usage before earliest garbage collection to memory usage after a last garbage collection in a same training time window indicates a higher anomaly degree. Therefore, it may be determined that the second statistical information in the first cluster corresponds to the low anomaly degree, it may be determined that the second statistical information in the second cluster corresponds to the middle anomaly degree, and it may be determined that the second statistical information in the third cluster corresponds to the high anomaly degree. The memory anomaly detection device determines the low anomaly degree corresponding to the second statistical information in the first cluster as the anomaly degrees corresponding to the training time window 1 and the training time window 2. The memory anomaly detection device determines the middle anomaly degree corresponding to the second statistical information in the second cluster as the anomaly degrees corresponding to the training time window 3 and the training time window 4. The memory anomaly detection device determines the high anomaly degree corresponding to the second statistical information in the third cluster as the anomaly degrees corresponding to the training time window 5 and the training time window 6.

Optionally, if the second statistical information includes a plurality of types of data, a specific implementation in which the memory anomaly detection device obtains, based on the second statistical information in the at least two clusters, the anomaly degree corresponding to the second statistical information in each cluster in the at least two clusters may be calculating, by the memory anomaly detection device for second statistical information in any cluster in the at least two clusters, an average value corresponding to each type of data in the plurality of types of data in the second statistical information in the any cluster, and performing weighted summation on the average value corresponding to each type of data, to obtain a first value corresponding to the second statistical information in the any cluster, and then determining, based on all obtained first values, the anomaly degree corresponding to the second statistical information in each cluster in the at least two clusters.

For example, the second statistical information corresponding to the any training time window includes the average downtime time, the change from the memory usage before the earliest garbage collection in the any training time window to the memory usage after the last garbage collection in the any training time window, the memory usage after the latest garbage collection in the any training time window, and a quantity of garbage collections in the any training time window.

The memory anomaly detection device performs the cluster analysis on the second statistical information corresponding to the training time window 1 to the training time window 6, and the second statistical information 1 and the second statistical information 2 that corresponds to the training time window 1 and the training time window 2 are classified into the first cluster. The second statistical information 3 and the second statistical information 4 that corresponds to the training time window 3 and the training time window 4 are classified into the second cluster. The second statistical information 5 and the second statistical information 6 that corresponds to the training time window 5 and the training time window 6 are classified into the third cluster.

For the second statistical information in the first cluster, the memory anomaly detection device calculates the average value for the average downtimes included in the second statistical information 1 and the second statistical information 2, and obtains that the average value is a1. The memory anomaly detection device calculates the average value for the memory usage after the latest garbage collection included in the second statistical information 1 and the second statistical information 2, and obtains that the average value is b1. The memory anomaly detection device calculates the average value for the changes that are included in the second statistical information 1 and the second statistical information 2 and that are between the memory usage after the last garbage collection and the memory usage before the earliest garbage collection that are in the same training time window, and obtains that the average value is c1. The memory anomaly detection device calculates an average value for quantities of garbage collections included in the second statistical information 1 and the second statistical information 2, and obtains that the average value is d1. The memory anomaly detection device performs weighted summation on a1, b1, c1, and d1, to obtain a first value 1. For example, a weighted summation formula is $M1=a1*50\%+b1*20\%-c1*20\%-d1*10\%$, where M1 is the first value 1, a weighting coefficient of a1 is 50%, a weighting coefficient of b1 is 20%, a weighting coefficient of c1 is −20%, and a weighting coefficient of d1 is −10%.

Likewise, for the second statistical information in the second cluster, the memory anomaly detection device calculates the average value for the average downtimes included in the second statistical information 3 and the second statistical information 4, and obtains that the average value is a2. The memory anomaly detection device calculates the average value of the memory usage after the latest garbage collection included in the second statistical information 3 and the second statistical information 4, and obtains that the average value is b2. The memory anomaly detection device calculates the average value for the changes that are included in the second statistical information 3 and the second statistical information 4 and that are between the memory usage after the last garbage collection and the memory usage before the earliest garbage collection that are in the same training time window, and obtains that the average value is c2. The memory anomaly detection device calculates the average value for quantities of garbage collections included in the second statistical information 3 and the second statistical information 4, and obtains that the average value is d2. The memory anomaly detection device performs weighted summation on a2, b2, c2, and d2, to obtain a first value 2. A weighted summation formula is $M2=a2*50\%+b2*20\%-c2*20\%-d2*10\%$, where M2 is the first value 2, a weighting coefficient of a2 is 50%, a weighting coefficient of b2 is 20%, a weighting coefficient of c2 is −20%, and a weighting coefficient of d2 is −10%.

Likewise, for the second statistical information in the third cluster, the memory anomaly detection device calculates the average value for the average downtimes included in the second statistical information 5 and the second statistical information 6, and obtains that the average value is a3. The memory anomaly detection device calculates the average value for the memory usage after the latest garbage collection included in the second statistical information 5 and the second statistical information 6, and obtains that the average value is b3. The memory anomaly detection device calculates the average value for the changes that are included in the second statistical information 5 and the second statistical information 6 and that are between the memory usage after the last garbage collection and the memory usage before the earliest garbage collection that are in the same training time window, and obtains that the average value is c3. The memory anomaly detection device calculates the average value for quantities of garbage collections included in the second statistical information 5 and the second statistical information 6, and obtains that the average value is d3. The memory anomaly detection device performs weighted summation on a3, b3, c3, and d3, to obtain a first value 3. A weighted summation formula is $M3=a3*50\%+b3*20\%-c3*20\%-d3*10\%$, where M3 is the first value 3, a weighting coefficient of a3 is 50%, a weighting coefficient of b3 is 20%, a weighting coefficient of c3 is −20%, and a weighting coefficient of d3 is −10%.

A larger first value indicates a higher anomaly degree. If the first number value 1 is less than the first number value 2, and the first number value 2 is less than the first number value 3, it may be determined that the second statistical information in the first cluster corresponds to the low anomaly degree, the second statistical information in the second cluster corresponds to the middle anomaly degree, and the second statistical information in the third cluster corresponds to the high anomaly degree. The memory anomaly detection device determines the low anomaly degree corresponding to the second statistical information in the first cluster as the anomaly degrees corresponding to the training time window 1 and the training time window 2. The memory anomaly detection device determines the middle anomaly degree corresponding to the second statistical information in the second cluster as the anomaly degrees corresponding to the training time window 3 and the training time window 4. The memory anomaly detection device determines the high anomaly degree corresponding to the second statistical information in the third cluster as the anomaly degrees corresponding to the training time window 5 and the training time window 6.

1104. The memory anomaly detection device determines an anomaly degree determining rule based on second statistical information and the anomaly degree that correspond to each training time window.

Optionally, the anomaly degree determining rule may be obtained using a decision tree or artificial neural network (ANN) training.

Optionally, the second statistical information further includes a quantity of garbage collections in a corresponding training time window. The anomaly degree determining rule is obtained using more parameters, and this helps improve accuracy of the detection result.

For example, the anomaly degree determining rule is as follows. If an average downtime in first statistical information corresponding to a first detection time window falls within a closed range of 0 to 2 seconds, memory usage that is included in the first statistical information and that is after a last garbage collection in the first detection time window falls within a closed range of 60% to 70%, an amount that is of a change from memory usage before earliest garbage collection in the first detection time window to the memory usage after the latest garbage collection in the first detection time window and that is included in the first statistical information falls within a closed range of 20% to 30%, and a quantity of garbage collections in the first statistical information is within one to five, it is determined that an anomaly degree corresponding to the first detection time window is the low anomaly degree. If the average downtime in the first statistical information corresponding to the first detection time window falls within the closed range of 0 to 2 seconds, the memory usage that is included in the first statistical information and that is after the latest garbage collection in the first detection time window is greater than 70% and is less than or equal to 80%, the amount that is of the change from the memory usage before the earliest garbage collection in the first detection time window to the memory usage after the last garbage collection in the first detection time window and that is included in the first statistical information is greater than 10% and is less than 20%, and the quantity of garbage collections in the first statistical information is within five to ten, it is determined that the anomaly degree corresponding to the first detection time window is the middle anomaly degree. If the average downtime in the first statistical information corresponding to the first detection time window is greater than 2 seconds, the memory usage that is included in the first statistical information and that is after the latest garbage collection in the first detection time window is greater than 80%, the amount that is of the change from the memory usage before the earliest garbage collection in the same first detection time window to the memory usage after the latest garbage collection in the first detection time window and that is included in the first statistical information is greater than or equal to 0 and is less than or equal to 10%, and the quantity of garbage collections in the first statistical information is within ten to fifteen, it is determined that the anomaly degree corresponding to the first detection time window is the high anomaly degree. In another case, it is determined that there is no anomaly.

It can be learned that, by implementing steps 1101 to 1105, the anomaly degree determining rule does not need to be set by a person. The memory anomaly detection device may obtain through analysis the anomaly degree determining rule based on information in the second memory log, and the anomaly degree determining rule is obtained through calculation based on a large amount of data in the second memory log. Therefore, the accuracy of the detection result can be improved by performing, using the anomaly degree determining rule, memory anomaly detection on a newly received first memory log.

Optionally, after determining, based on the anomaly degree corresponding to the second statistical information in each cluster, the anomaly degree corresponding to each training time window, and before determining the second statistical information and the anomaly degree determining rule that corresponds to each training time window, if there is a training time window with the high anomaly degree, maximum memory usage after garbage collection in the training time window with the high anomaly degree is less than preset usage, and a maximum downtime in the training time window with the high anomaly degree is less than a preset downtime, the memory anomaly detection device adjust an anomaly degree corresponding to the training time window with the high anomaly degree to a non-high anomaly degree (to be specific, a non-high anomaly degree such as the low anomaly degree or the middle anomaly degree). Otherwise, the anomaly degree corresponding to the training time window with the high anomaly degree is maintained as the high anomaly degree.

Optionally, the preset usage and the preset downtime that are used to calibrate the anomaly degree corresponding to the training time window may be the same as preset usage and a preset downtime that are used to calibrate an anomaly degree corresponding to a log information with the high anomaly degree in the first detection time window.

For example, the training time window 1 corresponds to the high anomaly degree. The training time window 1 includes log information 1 and log information 2. Memory usage after garbage collection included in the log information 1 is 75%, and a downtime included in the log information 1 is 0.01 second. Memory usage after garbage collection included in the log information 2 is 70%, and a downtime included in the log information 2 is 1 second. It can be learned that maximum memory usage after garbage collection included in the training time window 1 is 75%, and a maximum downtime in the training time window is 1 second. If the preset usage is 80%, and the preset downtime is 2 seconds, because the maximum memory usage after garbage collection included in the training time window 1 is less than the preset occupation rate, and the maximum downtime in the training time window does not exceed the preset downtime, the anomaly degree of the training time window 1 is adjusted to the non-high anomaly degree.

Higher memory usage and a longer downtime indicate a higher probability of memory anomaly. Therefore, adjusting, using the memory usage after garbage collection in the training time window and the downtime in the training time window, the anomaly degree of the training time window helps improve accuracy of the anomaly degree of the training time window.

Optionally, after determining an anomaly degree corresponding to log information in the first detection time window, the memory anomaly detection device may further perform cluster analysis on the first statistical information and all the second statistical information, and classify the first statistical information and all the second statistical information into at least two clusters, the memory anomaly detection device obtains, based on each cluster of information, the anomaly degrees corresponding to the first detection time window and the training time window, and the memory anomaly detection device updates the anomaly degree determining rule based on the anomaly degrees corresponding to the first detection time window and the training time window. Updating the anomaly degree determining rule helps ensure the accuracy of the detection result of the anomaly degree.

For example, first statistical information 1 corresponding to the first detection time window, first statistical information 2 corresponding to a detection time window 2, first statistical information 3 corresponding to a detection time window 3, the second statistical information 1 corresponding to the training time window 1, the second statistical information 2 corresponding to the training time window 2, and the second statistical information 3 corresponding to the training time window 3. After performing cluster analysis on memory usage after a last garbage collection in the first statistical information 1 to the first statistical information 3 and the second statistical information 1 to the second statistical information 3, the memory anomaly detection device classifies the memory usage after the last garbage collection in the first statistical information 1 and the second statistical information 1 into one cluster, classifies the memory usage after the last garbage collection in the first statistical information 2 and the second statistical information 2 into one cluster, and classifies the memory usage after the last garbage collection in the first statistical information 3 and the second statistical information 3 into one cluster.

The memory anomaly detection device may obtain, based on an average value of memory usage after the last garbage collection in each cluster, the anomaly degree corresponding to the first detection time window and the anomaly degree corresponding to the training time window. For example, an average value of the memory usage after the last garbage collection in the first statistical information 1 and the second statistical information 1 is 65%, the average value of the memory usage after the last garbage collection in the first statistical information 2 and the second statistical information 2 is 75%, and the average value of the memory usage after the last garbage collection in the first statistical information 3 and the second statistical information 3 is 85%. A larger average value of memory usage after a last garbage collection indicates a higher anomaly degree. Therefore, anomaly degrees corresponding to the first detection time window and the training time window 1 may be determined as the low anomaly degree, anomaly degrees corresponding to the detection time window 2 and the training time window 2 is determined as the middle anomaly degree, and anomaly degrees corresponding to the detection time window 3 and the training time window 3 is determined as the high anomaly degree. The memory anomaly detection device obtains, based on the anomaly degrees of the first detection time window 1, the detection time window 2, the detection time window 3, and the training time window 1 to the training time window 3, a new anomaly degree determining rule through retraining.

Optionally, after determining the anomaly degree corresponding to the log information in the first detection time window, if memory usage after garbage collection is greater than the preset usage, a downtime is greater than the preset downtime, and the anomaly degree is the non-high anomaly degree, the memory anomaly detection device performs the following steps performing the cluster analysis on the first statistical information and all the second statistical information, and classifying the first statistical information and all the second statistical information into the at least two clusters, obtaining, based on each cluster of information, the anomaly degrees corresponding to the first detection time window and the training time window, and updating the anomaly degree determining rule based on the anomaly degrees corresponding to the first detection time window and the training time window.

When the memory usage after garbage collection in the log information is greater than the preset usage, and the downtime is greater than the preset downtime, it indicates that memory anomaly may have occurred in this case. Therefore, the anomaly degree corresponding to the log information needs to be the high anomaly degree. However, a detection result obtained by the memory anomaly detection device according to the anomaly degree determining rule is that the anomaly degree corresponding to the log information is the non-high anomaly degree. It is clearly that the anomaly degree determining rule cannot accurately detect the anomaly degree corresponding to the log information. Therefore, in this case, the anomaly degree determining rule may be updated again. By implementing this implementation, when the anomaly degree determining rule cannot accurately detect the anomaly degree corresponding to the log information, the anomaly degree determining rule is updated. In this way, a CPU resource is saved.

In this embodiment of the present disclosure, the memory anomaly detection device may be divided into functional modules based on the foregoing method examples. For example, functional modules may be obtained through division corresponding to functions, or two or more functions may be integrated into one module. The integrated module may be implemented in a form of hardware, or may be implemented in a form of a software functional module. It should be noted that, in this embodiment of the present disclosure, module division is exemplary, and is merely a logical function division. In an embodiment, another division manner may be used.

Figure 12:
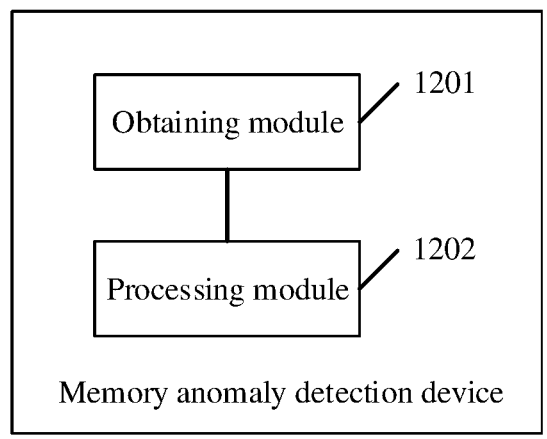
FIG. 12 is a schematic structural diagram of a memory anomaly detection device according to an embodiment of this application.

FIG. 12 is a memory anomaly detection device according to an embodiment of the present disclosure. The memory anomaly detection device may be a memory anomaly detection device shown in FIG. 6 or FIG. 11 in the foregoing method embodiments. The memory anomaly detection device includes an obtaining module 1201 and a processing module 1202.

The obtaining module 1201 is configured to obtain a first memory log. The first memory log includes log information of a plurality of garbage collections, and log information of each garbage collection includes a garbage collection time, and includes at least one of a downtime, memory usage after garbage collection, and memory usage before garbage collection. The processing module 1202 is configured to obtain, based on log information in a first detection time window, first statistical information corresponding to the first detection time window. The log information in the first detection time window is log information in which a garbage collection time belongs to the first detection time window. The first statistical information includes at least one of an average downtime in the first detection time window, a change from memory usage before earliest garbage collection in the first detection time window to memory usage after latest garbage collection in the first detection time window, and the memory usage after the latest garbage collection in the first detection time window. The processing module 1202 is further configured to determine, based on the first statistical information corresponding to the first detection time window, an anomaly degree corresponding to the log information in the first detection time window.

Optionally, a specific implementation in which the processing module 1202 determines, based on the first statistical information corresponding to the first detection time window, an anomaly degree corresponding to the log information in the first detection time window may be determining, based on the first statistical information corresponding to the first detection time window, an anomaly degree corresponding to the first detection time window, and determining the anomaly degree corresponding to the first detection time window as an anomaly degree corresponding to first log information in the first detection time window.

Optionally, the first log information is any log information in the first detection time window.

Optionally, the first log information is log information that belongs to the first detection time window and does not belong to a detection time window before the first detection time window.

Optionally, the processing module 1202 is further configured to, if there is log information with a high anomaly degree, memory usage after garbage collection in the log information with the high anomaly degree is less than preset usage, and a downtime in the log information with the high anomaly degree is less than a preset downtime, adjust an anomaly degree corresponding to the log information with the high anomaly degree to a non-high anomaly degree.

Optionally, the first statistical information further includes a quantity of garbage collections in the first detection time window.

Optionally, the processing module 1202 is further configured to, if the log information with the high anomaly degree continually occurs for a preset quantity of times in a preset time period, raise an alarm for memory anomaly.

Optionally, a specific implementation in which the processing module 1202 determines, based on the first statistical information corresponding to the first detection time window, an anomaly degree of the log information in the first detection time window may be determining, according to an anomaly degree determining rule and based on the first statistical information corresponding to the first detection time window, the anomaly degree of the log information in the first detection time window. The anomaly degree determining rule is obtained in advance based on a garbage collection time, and at least one of a downtime, memory usage after garbage collection, and memory usage before garbage collection that are included in a second memory log.

Optionally, the obtaining module 1201 is further configured to obtain a second memory log before obtaining the first memory log. The second memory log includes log information of a plurality of garbage collections, and log information of each garbage collection includes a garbage collection time, and includes at least one of a downtime, memory usage after garbage collection, and memory usage before garbage collection. The processing module 1202 is further configured to, for any one of a plurality of training time windows, determine, based on log information in the any training time window, second statistical information corresponding to the any training time window. The second statistical information includes at least one of an average downtime in the any training time window, a change from memory usage before earliest garbage collection in the any training time window to memory usage after a last garbage collection in the any training time window, and the memory usage after the latest garbage collection in the any training time window. The log information in the any training time window is log information in which a garbage collection time belongs to the training time window. The processing module 1202 is further configured to determine, based on second statistical information corresponding to the plurality of training time windows, an anomaly degree corresponding to each of the plurality of training time windows. The processing module 1202 is further configured to determine the anomaly degree determining rule based on second statistical information and the anomaly degree that correspond to each training time window.

Optionally, a specific implementation in which the processing module 1202 determines, based on second statistical information corresponding to the plurality of training time windows, an anomaly degree corresponding to each of the plurality of training time windows may be performing clustering on the second statistical information corresponding to the plurality of training time windows, to classify the second statistical information corresponding to the plurality of training time windows into at least two clusters, obtaining, based on the second statistical information in the at least two clusters, an anomaly degree corresponding to second statistical information in each cluster in the at least two clusters, and determining, based on the anomaly degree corresponding to the second statistical information in each cluster in the at least two clusters, the anomaly degree corresponding to each training time window. An anomaly degree corresponding to any training time window is an anomaly degree corresponding to a cluster to which second statistical information corresponding to the any training time window belongs.

Optionally, a specific implementation in which the processing module 1202 obtains, based on the second statistical information in the at least two clusters, an anomaly degree corresponding to second statistical information in each cluster in the at least two clusters may be, for second statistical information in any cluster in the at least two clusters, calculating an average value for target data in the second statistical information in the any cluster, where the target data is one type of data in the second statistical information in the any cluster, and target data in each piece of second statistical information is a same type of data, and determining, based on all average values obtained through calculation, the anomaly degree corresponding to the second statistical information in each cluster in the at least two clusters.

Optionally, the processing module 1202 is further configured to, after determining, based on the anomaly degree corresponding to the second statistical information in each cluster, the anomaly degree corresponding to each training time window, and before determining the anomaly degree determining rule based on second statistical information and the anomaly degree that correspond to each training time window, if there is a training time window with the high anomaly degree, and maximum memory usage after garbage collection in the training time window with the high anomaly degree is less than the preset usage, and a maximum downtime in the training time window with the high anomaly degree is less than the preset downtime, adjust an anomaly degree corresponding to the training time window with the high anomaly degree to the non-high anomaly degree.

Optionally, the second statistical information further includes a quantity of garbage collections in a corresponding training time window.

Figure 13:
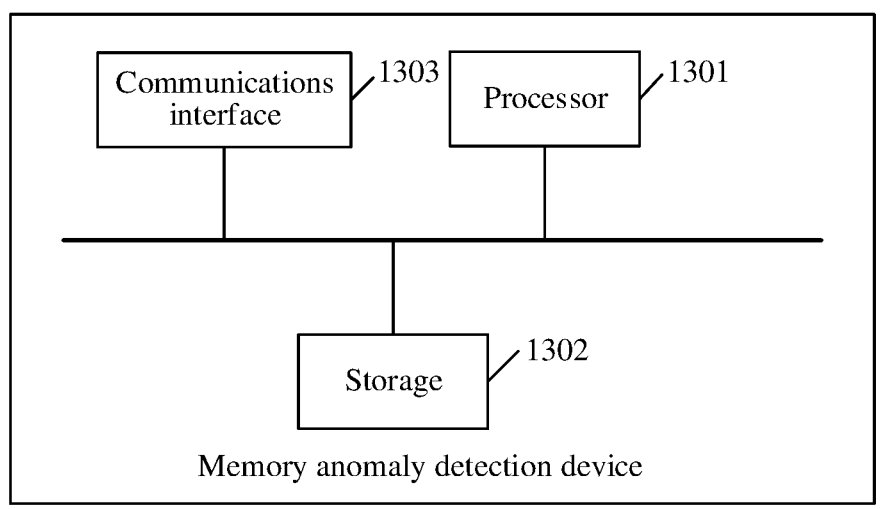
FIG. 13 is a schematic structural diagram of another memory anomaly detection device according to an embodiment of this application.

FIG. 13 is a schematic structural diagram of a memory anomaly detection device according to an embodiment of this application. The memory anomaly detection device may be a memory anomaly detection device shown in FIG. 6 or FIG. 11 in the foregoing method embodiments. As shown in FIG. 13, the memory anomaly detection device 1300 includes a processor 1301, a storage 1302, and a communications interface 1303. The processor 1301, the storage 1302, and the communications interface 1303 are connected to each other.

The processor 1301 may be a CPU, a general-purpose processor, a digital signal processor (DSP), an application-specific integrated circuit (ASIC), a field programmable gate array (FPGA), or another programmable logic device, a transistor logic device, a hardware component, or a combination thereof. Alternatively, the processor 1301 may be a combination of processors implementing a computing function, for example, a combination of one or more microprocessors, or a combination of the DSP and a microprocessor.

The communications interface 1303 is configured to implement communication with another network element (for example, a first device).

The processor 1301 may invoke program code stored in the storage 1302 to perform steps performed by a memory anomaly detection device described in FIG. 6 or FIG. 11 in the foregoing method embodiments, or may perform other steps performed by the memory anomaly detection device in the method embodiments.

A problem-resolving principle of the device provided in this embodiment of this application is similar to that of the method embodiments of this application. Therefore, for implementation of the device, refer to the implementation of the methods. For brevity of description, details are not described herein again.

In the foregoing embodiments, the description of each embodiment has respective focuses. For a part that is not described in detail in an embodiment, refer to related descriptions in other embodiments.

Finally, it should be noted that the foregoing embodiments are merely intended for describing the technical solutions of this application other than limiting this application. Although this application is described in detail with reference to the foregoing embodiments, a person of ordinary skill in the art should understand that they may still make modifications to the technical solutions described in the foregoing embodiments or make equivalent replacements to some or all technical features thereof, without departing from the scope of the technical solutions of the embodiments of this application.

What is claimed is:

1. A memory anomaly detection method comprising:
   obtaining a first memory log, wherein the first memory log comprises log information of a plurality of first garbage collections, wherein log information of each first garbage collection of the first garbage collections comprises a corresponding garbage collection time and a corresponding downtime;
   obtaining, based on log information in a first detection time window, first statistical information corresponding to the first detection time window, wherein the log information in the first detection time window is log information in which a garbage collection time belongs to the first detection time window, wherein the first statistical information comprises at least one of a first average downtime in the first detection time window, a change from memory usage before an earliest garbage collection in the first detection time window to memory usage after a latest garbage collection in the first detection time window, or the memory usage after the latest garbage collection in the first detection time window; and
   determining, based on the first statistical information, an anomaly degree corresponding to the log information in the first detection time window.

2. The memory anomaly detection method of claim 1, further comprising:
   determining, based on the first statistical information corresponding to the first detection time window, an anomaly degree corresponding to the first detection time window; and
   determining the anomaly degree corresponding to the first detection time window as an anomaly degree corresponding to first log information in the first detection time window.

3. The memory anomaly detection method of claim 2, wherein the first log information is any log information in the first detection time window.

4. The memory anomaly detection method of claim 2, wherein the first log information belongs to the first detection time window and does not belong to a detection time window that occurs before the first detection time window.

5. The memory anomaly detection method of claim 1, further comprising adjusting an anomaly degree corresponding to the log information with a high anomaly degree to a non-high anomaly degree when there is the log information with the high anomaly degree, memory usage after garbage collection in the log information with the high anomaly degree is less than a preset usage, and a downtime in the log information with the high anomaly degree is less than a preset downtime.

6. The memory anomaly detection method of claim 1, wherein the first statistical information further comprises a first quantity of garbage collections in the first detection time window.

7. The memory anomaly detection method of claim 1, further comprising raising an alarm for a memory anomaly when log information with a high anomaly degree continually occurs for a preset quantity of times in a preset time period.

8. The memory anomaly detection method of claim 1, further comprising determining, according to an anomaly degree determining rule, the anomaly degree corresponding to the log information in the first detection time window, wherein the anomaly degree determining rule is obtained in advance based on a garbage collection time and at least one of a downtime, memory usage after garbage collection, and memory usage before garbage collection that are comprised in a second memory log.

9. The memory anomaly detection method of claim 8, further comprising:
   obtaining the second memory log, wherein the second memory log comprises log information of a plurality of second garbage collections, wherein log information of each second garbage collection of the second garbage collections comprises a corresponding garbage collection time and at least one of a corresponding downtime, memory usage after the each second garbage collection, and memory usage before the each second garbage collection;
   determining, for any one of a plurality of training time windows based on log information in the any one of the training time windows, second statistical information corresponding to the any one of the training time windows, wherein the second statistical information comprises at least one of a second average downtime in the any one of the training time windows, a change from memory usage before an earliest garbage collection in the any one of the training time windows to memory usage after a last garbage collection in the any one of the training time windows, and the memory usage after the latest garbage collection in the any one of the training time windows, wherein the log information in the any one of the training time windows is log information in which a garbage collection time belongs to the training time window;

determining, based on second statistical information corresponding to the plurality of training time windows, an anomaly degree corresponding to each of the training time windows; and determining the anomaly degree determining rule based on the second statistical information and the anomaly degree that correspond to each of the training time windows.

10. The memory anomaly detection method of claim 9, further comprising:

performing clustering on the second statistical information corresponding to the plurality of training time windows to classify the second statistical information corresponding to the training time windows into at least two clusters;

obtaining, based on the second statistical information in the at least two clusters, an anomaly degree corresponding to second statistical information in each cluster in the at least two clusters; and determining, based on the anomaly degree corresponding to the second statistical information in the each cluster, the anomaly degree corresponding to each of the training time windows, wherein an anomaly degree corresponding to any training time window corresponds to a cluster to which second statistical information corresponding to the any training time window belongs.

11. The memory anomaly detection method of claim 10, further comprising:

calculating, for second statistical information in any cluster in the at least two clusters, an average value for target data in the second statistical information in the any cluster, wherein the target data is one type of data in the second statistical information in the any cluster, wherein the target data in each piece of second statistical information is a same type of data; and determining, based on all average values obtained through calculation, the anomaly degree corresponding to the second statistical information in the each cluster in the at least two clusters.

12. The memory anomaly detection method of claim 9, further comprising adjusting an anomaly degree corresponding to the training time window with a high anomaly degree to a non-high anomaly degree when there is a training time window with the high anomaly degree, maximum memory usage after each of the second garbage collections in the training time window with the high anomaly degree is less than a preset usage, and a maximum downtime in the training time window with the high anomaly degree is less than a preset downtime.

13. The memory anomaly detection method of claim 9, wherein the second statistical information further comprises a second quantity of garbage collections in a corresponding training time window.

14. The memory anomaly detection method of claim 1, wherein the first garbage collections further comprises corresponding memory usage after the each first garbage collection and corresponding memory usage before the each first garbage collection.

15. A memory anomaly detection device comprising:

a memory configured to store instructions; and a processor coupled to the memory and configured to execute the instructions to cause the memory anomaly detection device to:

obtain a first memory log, wherein the first memory log comprises log information of a plurality of first garbage collections, wherein log information of each first garbage collection of the first garbage collections comprises a corresponding garbage collection time and a corresponding downtime;

obtain, based on log information in a first detection time window, first statistical information corresponding to the first detection time window, wherein the log information in the first detection time window comprises a garbage collection time that belongs to the first detection time window, wherein the first statistical information comprises at least one of a first average downtime in the first detection time window, a change from memory usage before an earliest garbage collection in the first detection time window to memory usage after a latest garbage collection in the first detection time window, and the memory usage after the latest garbage collection in the first detection time window; and determine, based on the first statistical information, an anomaly degree corresponding to the log information in the first detection time window.

16. The memory anomaly detection device of claim 15, wherein the first statistical information further comprises a quantity of garbage collections in the first detection time window.

17. The memory anomaly detection device of claim 15, wherein the processor is further configured to execute the instructions to cause the memory anomaly detection device to determine, according to an anomaly degree determining rule, the anomaly degree corresponding to the log information in the first detection time window, wherein the anomaly degree determining rule is obtained in advance based on a garbage collection time and at least one of a downtime, memory usage after garbage collection, and the memory usage before garbage collection that are comprised in a second memory log.

18. The memory anomaly detection device of claim 17, wherein the processor is further configured to execute the instructions to cause the memory anomaly detection device to:

obtain the second memory log, wherein the second memory log comprises the log information of a plurality of second garbage collections, wherein log information of each second garbage collection of the second garbage collections comprises a corresponding garbage collection time and comprises at least one of a corresponding downtime, memory usage after the each second garbage collection, and memory usage before the each second garbage collection;

determine, for any one of a plurality of training time windows based on log information in the any one of the training time windows, second statistical information corresponding to the any one of the training time windows, wherein the second statistical information comprises at least one of a second average downtime in the any one of the training time windows, a change from memory usage before an earliest garbage collection in the any one of the training time windows to memory usage after a last garbage collection in the any one of the training time windows, and the memory usage after the latest garbage collection in the any one of the training time windows, wherein the log information in the any one of the training time windows is log information in which a garbage collection time belongs to the training time window;

determine, based on second statistical information corresponding to the plurality of training time windows, an anomaly degree corresponding to each of the training time windows; and determine the anomaly degree determining rule based on the second statistical information and the anomaly degree that correspond to each of the training time windows.

19. The memory anomaly detection device of claim 18, wherein the processor is further configured to execute the instructions to cause the memory anomaly detection device to:

perform clustering on the second statistical information corresponding to the plurality of training time windows, to classify the second statistical information corresponding to the training time windows into at least two clusters;

obtain, based on the second statistical information in the at least two clusters, an anomaly degree corresponding to second statistical information in each cluster in the at least two clusters; and determine, based on the anomaly degree corresponding to the second statistical information in the each cluster, the anomaly degree corresponding to each of the training time windows, wherein an anomaly degree corresponding to any training time window corresponds to a cluster to which second statistical information corresponding to the any training time window belongs.

20. The memory anomaly detection device of claim 19, wherein the processor is further configured to execute the instructions to cause the memory anomaly detection device to be configured to:

calculate, for second statistical information in any cluster in the at least two clusters, an average value for target data in the second statistical information in the any cluster, wherein the target data is one type of data in the second statistical information in the any cluster, wherein the target data in each piece of second statistical information is a same type of data; and determine, based on all average values obtained through calculation, the anomaly degree corresponding to the second statistical information in the each cluster in the at least two clusters.

21. The memory anomaly detection device of claim 18, wherein the second statistical information further comprises a quantity of garbage collections in a corresponding training time window.

22. The memory anomaly detection device of claim 15, wherein the first garbage collections further comprises corresponding memory usage after the each first garbage collection and corresponding memory usage before the each first garbage collection.

23. A computer program product comprising instructions that are stored on a non-transitory computer-readable medium and that, when executed by a processor, cause a memory anomaly detection device to:

obtain a first memory log, wherein the first memory log comprises log information of a plurality of first garbage collections, wherein log information of each first garbage collection of the first garbage collections comprises a corresponding garbage collection time and a corresponding downtime;

obtain, based on log information in a first detection time window, first statistical information corresponding to the first detection time window, wherein the log information in the first detection time window is log information in which a garbage collection time belongs to the first detection time window, wherein the first statistical information comprises at least one of a first average downtime in the first detection time window, a change from memory usage before an earliest garbage collection in the first detection time window to memory usage after a latest garbage collection in the first detection time window, or the memory usage after the latest garbage collection in the first detection time window; and determine, based on the first statistical information, an anomaly degree corresponding to the log information in the first detection time window.

24. The computer program product of claim 23, wherein the first garbage collections further comprises corresponding memory usage after the each first garbage collection and corresponding memory usage before the each first garbage collection.

* * * * *